United States Patent
Buskirk et al.

(10) Patent No.: US 11,639,057 B2
(45) Date of Patent: May 2, 2023

(54) METHODS OF FABRICATING MICRO-VALVES AND JETTING ASSEMBLIES INCLUDING SUCH MICRO-VALVES

(71) Applicant: Matthews International Corporation, Pittsburgh, PA (US)

(72) Inventors: William A. Buskirk, Albany, OR (US); Steven E. Flego, Portland, OR (US); Charles C. Haluzak, Philomath, OR (US); John Whitlock, Pittsburgh, PA (US); Eric R. Miller, Seattle, WA (US); Glenn J. T. Leighton, South Yorkshire (GB)

(73) Assignee: Matthews International Corporation, Pittsburgh, PA (US)

( * ) Notice: Subject to any disclaimer, the term of this patent is extended or adjusted under 35 U.S.C. 154(b) by 999 days.

(21) Appl. No.: 16/407,476

(22) Filed: May 9, 2019

(65) Prior Publication Data
US 2019/0344568 A1 Nov. 14, 2019

Related U.S. Application Data

(60) Provisional application No. 62/670,299, filed on May 11, 2018.

(51) Int. Cl.
| | | |
|---|---|---|
| *B41J 2/16* | (2006.01) | |
| *F16K 99/00* | (2006.01) | |
| *B41J 2/14* | (2006.01) | |

(52) U.S. Cl.
CPC ............. *B41J 2/1607* (2013.01); *B41J 2/164* (2013.01); *B41J 2/1623* (2013.01); *B41J 2/1632* (2013.01);
(Continued)

(58) Field of Classification Search
CPC ...... B41J 2/1607; B41J 2/1623; B41J 2/1632; B41J 2/164; B41J 2002/14258;
(Continued)

(56) References Cited

U.S. PATENT DOCUMENTS

| | | | |
|---|---|---|---|
| 4,072,959 | A | 2/1978 | Elmqvist |
| 4,340,083 | A | 7/1982 | Cummins |

(Continued)

FOREIGN PATENT DOCUMENTS

| | | |
|---|---|---|
| CN | 201022022 Y | 2/2008 |
| CN | 101386236 A | 3/2009 |

(Continued)

OTHER PUBLICATIONS

IP.com search (Year: 2022).*
(Continued)

*Primary Examiner* — Lisa Solomon
(74) *Attorney, Agent, or Firm* — DLA Piper LLP

(57) ABSTRACT

A method of constructing a micro-valve includes providing a substrate for an actuating beam of the micro-valve, the substrate including a first surface and a second surface. The method also includes forming a plurality of constituent layers on the first surface of the actuating beam, including a layer of piezoelectric material. The method also includes removing a portion of the substrate from at least one of the first surface or the second surface to define a cantilevered portion of the actuating beam. The method also includes providing an orifice plate including an orifice. The method also includes providing a valve seat on a surface of the orifice plate, the valve seat having an opening aligned with the orifice. The method also includes attaching the surface of the orifice plate to the second surface via an adhesive such that an overlapping portion of the cantilevered portion overlaps the orifice.

17 Claims, 18 Drawing Sheets

(52) U.S. Cl.
CPC . *F16K 99/0048* (2013.01); *B41J 2002/14258* (2013.01); *B41J 2202/05* (2013.01); *B41J 2202/22* (2013.01); *F16K 2099/008* (2013.01); *F16K 2099/0092* (2013.01)

(58) Field of Classification Search
CPC .. B41J 2202/05; B41J 2202/22; B41J 2/1642; B41J 2002/14491; B41J 2/14282; B41J 2/1629; B41J 2/1631; B41J 2/1645; B41J 2/1646; B41J 2/1614; F16K 99/0048; F16K 2099/008; F16K 2099/0092; F16K 99/0007
See application file for complete search history.

(56) References Cited

U.S. PATENT DOCUMENTS

| | | | |
|---|---|---|---|
| 4,409,601 A | 10/1983 | Nilsson et al. | |
| 4,450,375 A | 5/1984 | Siegal | |
| 4,564,846 A | 1/1986 | Siegal | |
| 4,629,926 A | 12/1986 | Siegal | |
| 4,758,226 A | 7/1988 | Carre | |
| 4,809,017 A | 2/1989 | Fost | |
| 4,962,391 A | 10/1990 | Kitahara et al. | |
| 5,072,959 A | 12/1991 | Marullo | |
| 5,079,472 A | 1/1992 | Uhl et al. | |
| 5,126,755 A | 6/1992 | Sharpe et al. | |
| 5,343,894 A | 9/1994 | Frisch et al. | |
| 5,441,597 A | 8/1995 | Bonne et al. | |
| 5,452,878 A | 9/1995 | Gravesen et al. | |
| 5,619,177 A | 4/1997 | Johnson et al. | |
| 5,784,083 A | 7/1998 | Schumann et al. | |
| 5,810,325 A | 9/1998 | Carr | |
| 5,857,491 A | 1/1999 | Cooke | |
| 5,901,939 A | 5/1999 | Cabuz et al. | |
| 6,024,340 A | 2/2000 | Lazarus et al. | |
| 6,116,517 A | 9/2000 | Heinzl et al. | |
| 6,142,444 A | 11/2000 | Kluge | |
| 6,164,621 A | 12/2000 | Bouchard et al. | |
| 6,352,337 B1 | 3/2002 | Sharma | |
| 6,367,767 B2 | 4/2002 | Weinmann et al. | |
| 6,412,913 B1 | 7/2002 | Moon et al. | |
| 6,450,204 B2 | 9/2002 | Itzhaky | |
| 6,460,979 B1 | 10/2002 | Heinzl et al. | |
| 6,464,341 B1 | 10/2002 | Furlani et al. | |
| 6,581,638 B2 | 6/2003 | Frisch et al. | |
| 6,590,267 B1 | 7/2003 | Goodwin-Johanssen et al. | |
| 6,676,249 B2 | 1/2004 | Lebens | |
| 6,811,136 B2 | 11/2004 | Eberhardt et al. | |
| 6,959,911 B2 | 11/2005 | Strasser et al. | |
| 6,988,706 B2 | 1/2006 | Seeley et al. | |
| 6,991,214 B2 | 1/2006 | Richter | |
| 7,159,841 B2 | 1/2007 | Gemmen et al. | |
| 7,299,818 B2 | 11/2007 | Pinter et al. | |
| 7,322,376 B2 | 1/2008 | Frisch | |
| 7,448,412 B2 | 11/2008 | Teach et al. | |
| 7,540,592 B2 | 6/2009 | Silverbrook | |
| 9,975,347 B2 | 5/2018 | Tozuka et al. | |
| 10,155,385 B2 | 12/2018 | Hiramoto et al. | |
| 2003/0030705 A1 | 2/2003 | Koike et al. | |
| 2003/0076649 A1 | 4/2003 | Speakman | |
| 2003/0222236 A1 | 12/2003 | Eberhardt et al. | |
| 2003/0234835 A1 | 12/2003 | Torii et al. | |
| 2004/0137300 A1 | 7/2004 | Gemmen et al. | |
| 2005/0133751 A1 | 6/2005 | Seeley et al. | |
| 2005/0002591 A1 | 11/2005 | Wong et al. | |
| 2006/0092237 A1 | 5/2006 | Kwon et al. | |
| 2006/0209137 A1 | 9/2006 | Kojima et al. | |
| 2006/0255064 A1 | 11/2006 | Donaldson | |
| 2010/0141709 A1 | 6/2010 | DeBrabander et al. | |
| 2010/0321448 A1 | 12/2010 | Buestgens et al. | |
| 2011/0073188 A1 | 3/2011 | Marcus et al. | |
| 2011/0073788 A1 | 3/2011 | Marcus et al. | |
| 2012/0268529 A1 | 10/2012 | Baumer et al. | |
| 2014/0333703 A1 | 11/2014 | Buskirk et al. | |
| 2016/0189494 A1 | 6/2016 | Levesque et al. | |
| 2017/0274658 A1 | 9/2017 | Terasaki | |
| 2018/0056288 A1 | 3/2018 | Abate et al. | |
| 2018/0147848 A1 | 5/2018 | Teranishi et al. | |
| 2018/0162140 A1 | 6/2018 | Buskirk et al. | |
| 2018/0361747 A1 | 12/2018 | Yaginuma et al. | |
| 2018/0370230 A1 | 12/2018 | Nakagawa et al. | |
| 2019/0086793 A1 | 3/2019 | Lyons et al. | |
| 2019/0344564 A1 | 11/2019 | Buskirk et al. | |
| 2019/0346051 A1 | 11/2019 | Buskirk et al. | |
| 2019/0346066 A1 | 11/2019 | Buskirk et al. | |
| 2019/0346067 A1 | 11/2019 | Buskirk et al. | |
| 2021/0129173 A1 | 5/2021 | Buskirk et al. | |

FOREIGN PATENT DOCUMENTS

| | | |
|---|---|---|
| DE | 3608550 A1 | 9/1987 |
| DE | 10133939 | 1/2003 |
| DE | 10 2004 035 844 B3 | 10/2005 |
| DE | 10 2007 034 049 B3 | 6/2008 |
| EP | 0 170 990 A1 | 2/1986 |
| EP | 0941434 A1 | 9/1999 |
| EP | 1 104 863 A2 | 6/2001 |
| EP | 2 017 511 A1 | 1/2009 |
| EP | 3187337 A1 | 7/2017 |
| JP | 57-178767 A | 11/1982 |
| JP | 57-197176 A | 12/1982 |
| JP | S63-185471 A | 8/1988 |
| JP | S64-18643 A | 1/1989 |
| JP | 02033979 | 2/1990 |
| JP | 02273242 | 11/1990 |
| JP | 09-011471 A | 1/1997 |
| JP | 2819141 A | 10/1998 |
| JP | H11-105274 | 4/1999 |
| JP | 2000-296619 A | 10/2000 |
| JP | 2002532658 A | 10/2002 |
| JP | 2004-308554 A | 11/2004 |
| JP | 2009243911 A | 10/2009 |
| JP | 2012507417 A | 3/2012 |
| JP | 2012241824 A | 12/2012 |
| JP | 05116284 | 1/2013 |
| JP | 2013-533817 A | 8/2013 |
| JP | 2016132188 A | 7/2016 |
| JP | 2016132189 A | 7/2016 |
| JP | 2016525658 A | 8/2016 |
| WO | 1986005722 A1 | 10/1986 |
| WO | 2000038928 A1 | 7/2000 |
| WO | WO-02/37661 A1 | 5/2002 |
| WO | WO-2009/010117 A1 | 1/2009 |
| WO | WO-2010/144343 A3 | 12/2010 |
| WO | WO-2012/002942 A1 | 1/2012 |
| WO | 2019215671 A1 | 11/2014 |
| WO | WO-2014/182984 A1 | 11/2014 |
| WO | WO-2016/030566 | 3/2016 |
| WO | 2019215668 A1 | 11/2019 |
| WO | 2019215669 A1 | 11/2019 |
| WO | 2019215672 A1 | 11/2019 |
| WO | 2019215674 A1 | 11/2019 |
| WO | 2021087218 A1 | 5/2021 |

OTHER PUBLICATIONS

Inkjet Printing Definition, https://en.wikipedia.org/wiki/inkjet_printing, 15 pages.
International Search Report and Written Opinion for PCT/US2014/037422 dated Sep. 3, 2014.
Partial International Search Report and Provisional Opinion for International Application No. PCT/IB2019/053840, dated Sep. 12, 2019, 10 pages.
Supplementary European Search Report and Written Opinion for EP14795127 dated Jun. 8, 2018.
Xiaoting et al. "Vibration Energy Harvesting Using Piezoelectric Unimorph Cantilevers With Unequal Piezoelectric and Nonpiezoelectric Lengths" Dec. 2010, Applied Physics Letters 97:233503 (PubMed,

(56) References Cited

OTHER PUBLICATIONS

DOI: 10.1063/1.3521389, retrieved from the internet Aug. 30, 2020).

* cited by examiner

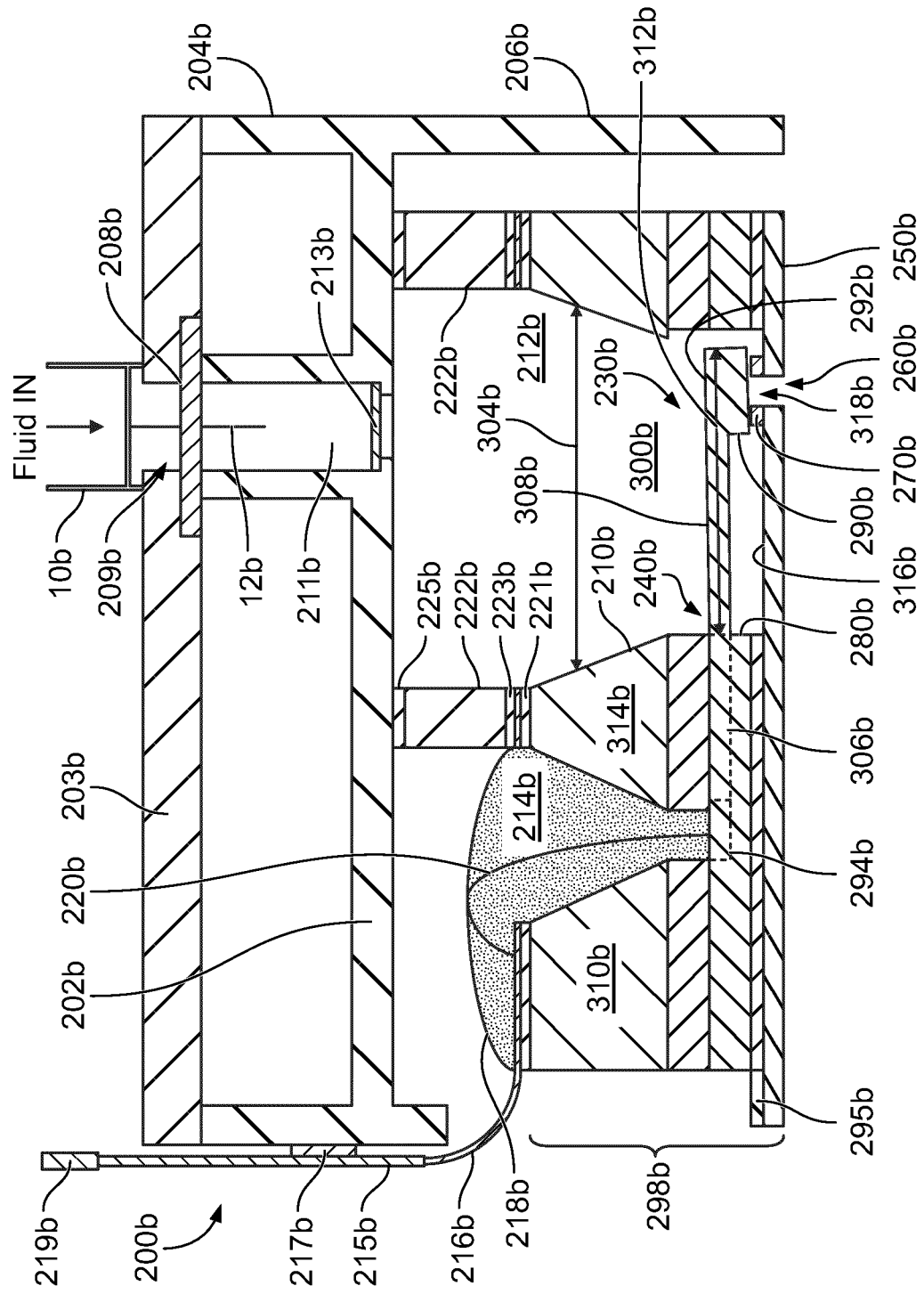

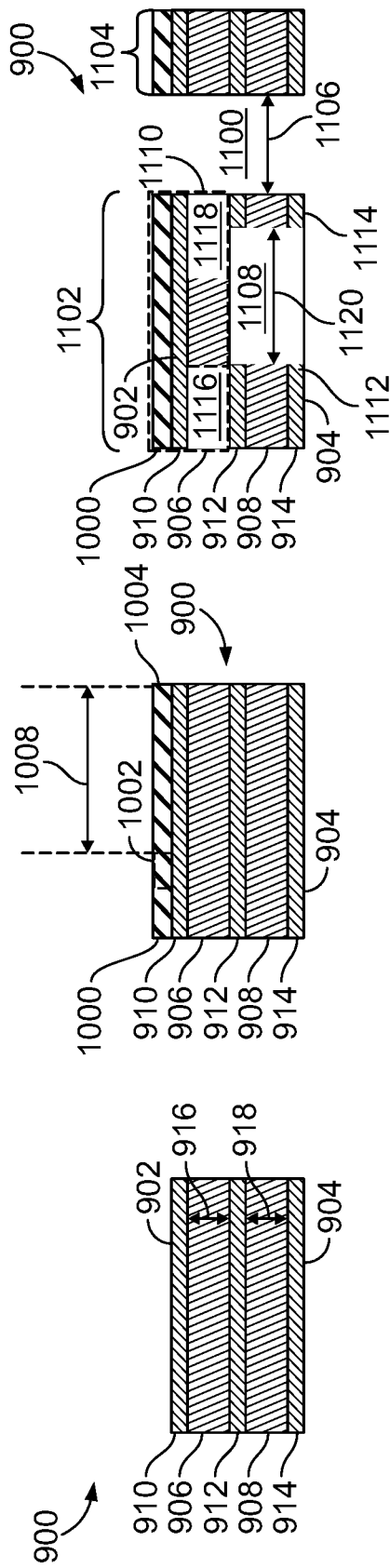
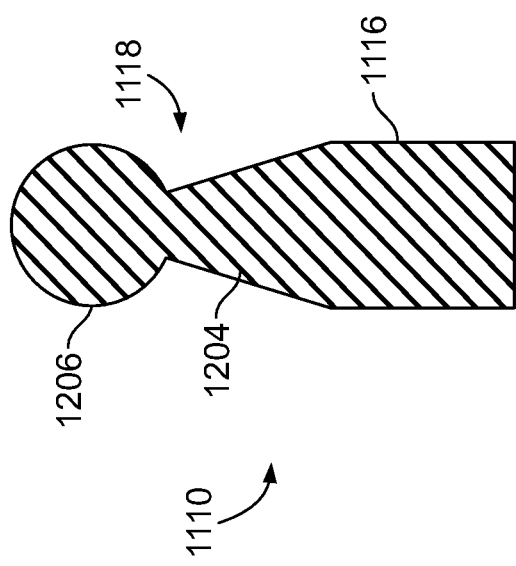
FIG. 11
FIG. 10
FIG. 12
FIG. 9

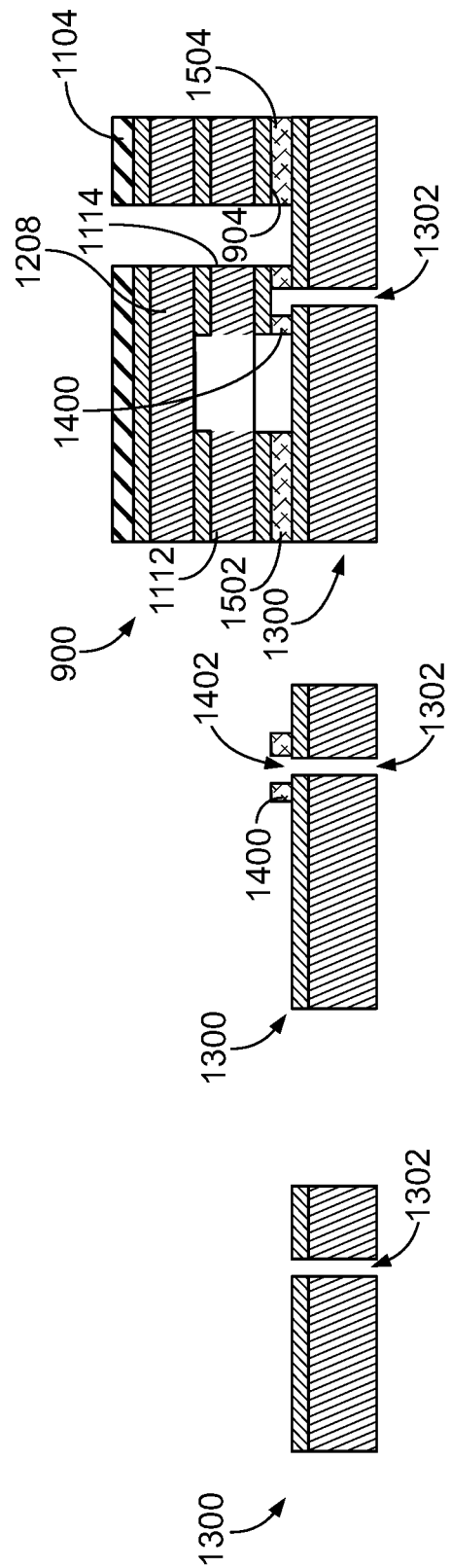

METHODS OF FABRICATING MICRO-VALVES AND JETTING ASSEMBLIES INCLUDING SUCH MICRO-VALVES

CROSS-REFERENCE TO RELATED APPLICATIONS

The present application claims priority to and benefit of U.S. Provisional Application No. 62/670,299 filed May 11, 2018, the disclosure of which is hereby incorporated by reference herein in its entirety.

TECHNICAL FIELD

The present disclosure relates generally to the field of micro-valves fabricated using micro-electro-mechanical systems (MEMS) techniques. More specifically, the present disclosure relates to a jetting assembly including micro-valves that are used for industrial marking and coding.

BACKGROUND

Conventional printing technologies have several shortcomings. For example, continuous inkjet printers have certain deficiencies that are difficult to eliminate. The process of generating droplets from an ink supply, for example, may lead to ink dripping in an undesired direction (e.g., away from a target), leading to maintenance requirements. Additionally, makeup fluid is lost over time as a result of evaporation, requiring continuous replenishment. Other maintenance costs, such as repairing orifice plates due to degradation, are also required.

SUMMARY

One embodiment relates to a method of constructing a micro-valve. The method includes providing a substrate for an actuating beam of the micro-valve, the substrate including a first surface and a second surface. The method also includes forming a plurality of constituent layers on top of the first surface of the actuating beam, including a layer of piezoelectric material. The method also includes removing a portion of the substrate at at least one of the first surface or the second surface to define a cantilevered portion of the actuating beam. The method also includes providing an orifice plate including an orifice. The method also includes providing a valve seat on a surface of the orifice plate, the valve seat having an opening aligned with the orifice. The method also includes attaching the surface of the orifice plate to the second surface via an adhesive such that an overlapping portion of the cantilevered portion overlaps the orifice.

Another embodiment relates to a method of constructing a jetting assembly. The method includes forming a plurality of micro-valves on an orifice plate, each of the micro-valves including an actuating beam having a cantilevered portion. The method also includes providing an input fluid manifold including a first surface, a second surface, and a first opening extending from the first surface to the second surface. The method also includes attaching the first surface of the input fluid manifold to a device layer that includes the actuating beams such that some of the cantilevered portions of the actuating beams are aligned with the corresponding first opening. The input fluid manifold and the plurality of micro-valves form a valve body, the valve body including a fluid reservoir defined in part by the first opening. The method also includes attaching a flex circuit to the second surface of the input fluid manifold, the flex circuit includes a gap aligned with the opening. The method also includes attaching a carrier to the valve body.

Still another embodiment relates to a method for forming a jetting assembly. The method includes forming a plurality of orifices in an orifice plate. A plurality of actuating beams are formed on a device layer, each of the plurality of actuating beams having a cantilevered portion. The device layer is bonded to the orifice plate to form a plurality of micro-valves such that an overlapping portion of each of the plurality of actuating beams overlaps a corresponding orifice of the orifice plate. A first surface of an input fluid manifold is bonded to the device layer and the orifice plate. The input fluid manifold defines a first opening extending from the first surface to the second surface opposite the first surface. The cantilevered portion of each of the plurality of actuating beams is aligned with the corresponding first opening such that the input fluid manifold and the plurality of micro-valves form a valve body, the valve body including a fluid reservoir defined in part by the first opening. A flex circuit is disposed on the second surface of the input fluid manifold. Electrical connections are formed between the flex circuit and the actuating beam. An interposer is disposed on the flex circuit, the interposer having a rigidity greater than a rigidity of the orifice plate. Furthermore, a carrier is attached to the interposer.

BRIEF DESCRIPTION OF THE DRAWINGS

The disclosure will become more fully understood from the following detailed description, taken in conjunction with the accompanying figures, in which:

FIG. 5B is a-cross sectional view of a jetting assembly including a micro-valve, according to another example embodiment.

FIGS. 9, 10, 11, 12, 13, 14, and 15 are views of elements of a micro-valve at various points of the method described with respect to FIG. 8, according to an example embodiment.

DETAILED DESCRIPTION

Figure 1:
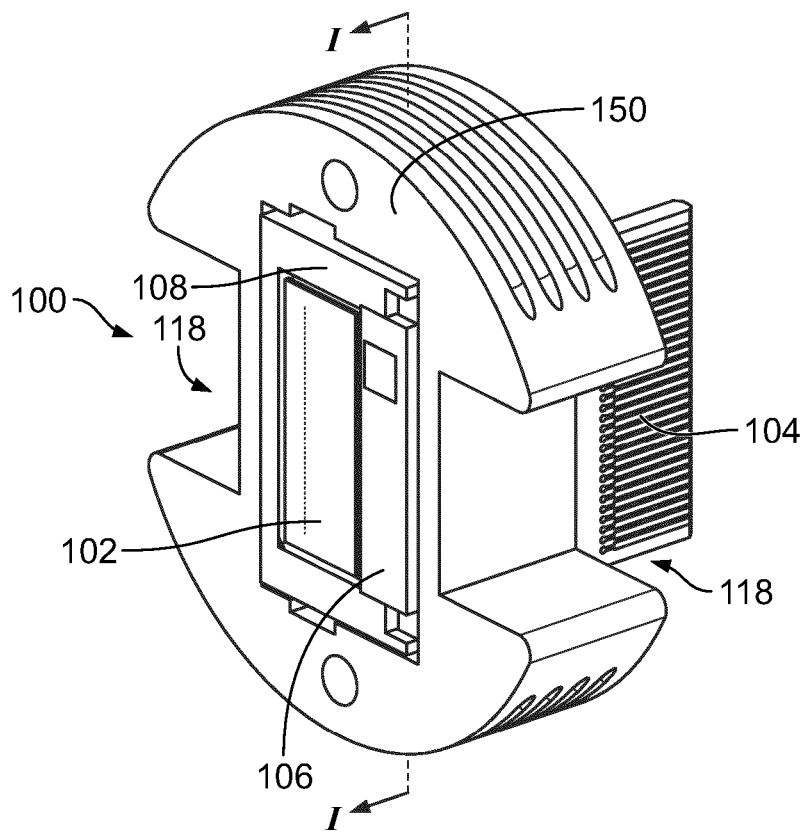
FIG. 1 is a perspective of a jetting assembly disposed in a holder, according to an example embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the figures, described herein is a jetting assembly including multiple micro-valves. The micro-valves described herein employ an actuating beam having a sealing member disposed thereon. The utilization of such an actuating beam enables tailoring the micro-valve to eliminate or reduce various deficiencies associated with conventional technologies including continuous inkjet jetting assemblies. For example, in various embodiments, the micro-valve includes a spacing member disposed between the actuating beam and an orifice plate. The spacing member maintains a spacing of a first end of the actuating beam and an orifice within the orifice plate so as to prevent squeeze film damping of the actuating beam. The actuating beam extends over the orifice from the spacing member and a sealing member extends towards the orifice to form a seal at the orifice. Thus, without application of any electrical energy to the actuating beam, the sealing member seals off the orifice. In other words, the default position of the actuating beam (e.g., configured by careful selection of the materials contained therein) is that the micro-valve is closed. As such, fluid (e.g., ink, solvent, etc.) disposed in the micro-valve is sealed off from the external environment of the jetting assembly. This eliminates evaporation of the fluid, which reduces clogs. Additionally, the limited evaporation enables faster-drying ink to be used, which allows for printing at higher speeds than conventional systems.

To mitigate against fluid leaks, the micro-valves described herein include a sealing structure configured to form a seal that separates the orifice from a volume proximate to the actuating beam when the actuating beam is in its default position. The sealing structure may include any combination of a plurality of components designed to ensure the formation of the seal. For example, in various embodiments, the sealing structure includes a valve seat disposed on the orifice plate proximate to the orifice. The valve seat may surround the orifice and define an opening aligned with the orifice to define a fluid plenum. The sealing member may contact the valve seat with the actuating beam in the default position. In some embodiments, the valve seat is constructed of a compliant material to facilitate the formation of an enhanced seal resulting from pressure applied due to curvature of the actuating beam.

In another aspect, the sealing structure may include components attached to or extending from the sealing member. For example, in one embodiment, the sealing structure includes a compliant structure extending from an orifice-facing surface of the sealing member. The compliant structure may include a narrow portion and a wider portion having a cross-sectional area greater than that of the orifice. As a result, the actuating beam compresses the compliant structure towards the orifice plate to facilitate the formation of the seal. Alternatively, or additionally, the sealing structure may include a sealing blade extending from the orifice-facing surface to contact the valve seat or orifice plate. The sealing blade further facilitates the formation of the seal due to the pressure resulting from its relatively small cross-sectional area, which focuses downward pressure applied via the actuating beam to a point to form a tight seal. Thus, the various structures described herein enhance the seals formed when the actuating beam is in its default position.

As described herein, the term "default position," when used in describing an actuating beam of a micro-valve, describes the position of the actuating beam with respect to various other components of the micro-valve without application of any control signals (e.g., an electrical charge, current or voltage) to the actuating beam. In other words, the default position is the position of the actuating beam (and any components attached thereto) when the actuating beam is a passive state. It should be appreciated that other embodiments are envisioned in which the default position is an open position of the actuating beam.

Referring now to FIG. 1, a perspective view of a jetting assembly 100 disposed in a holder 150 is shown, according to an example embodiment. Jetting assembly 100 includes a valve body 102 attached to a carrier 108. The holder 150 includes a substantially circular-shaped body having an opening contained therein adapted to receive the jetting assembly 100. Holder 150's body may include notches 118 extending from a peripheral edge thereof to facilitate attachment of the holder 150 to a marking device. The valve body 102 may be a component of a marking device. In an exemplary embodiment, the valve body 102 is used in an industrial marking device including a pressurized ink supply. In other embodiments, the valve body 102 or any of the micro-valves described herein may be used in pneumatic applications, where the fluid includes a gas (e.g., air, nitrogen, oxygen, etc.).

As described herein, the valve body 102 includes an input fluid manifold attached to a plurality of micro-valves. The micro-valves and the input fluid manifold form a reservoir configured to hold fluid received from an external fluid supply. In other embodiments, the valve body 102 may define a plurality of fluid reservoirs, each fluid reservoir corresponding to at least a portion of the plurality of micro-valves. In such embodiments, each fluid reservoir may be filled with a different colored ink (e.g., black, green, yellow, cyan, etc.) or a different fluid so as to provide multi-color capable jetting assembly or a multi fluid deposition assembly. In various embodiments, the micro-valves include an actuating beam configured to move (e.g., bend, curve, twist, etc.) in response to voltages being applied thereto to temporarily open fluid outlets at orifices in an orifice plate. As a result, droplets are emitted from the fluid outlets onto a target to produce a desired marking pattern on the target.

As shown, a circuit board 104 is attached to a side surface of the carrier 108. Circuit board 104 may include a plurality of electrical pathways and provide a point of connection between valve body 102 and an electrical controller (e.g., via a wiring harness). The electrical controller may supply control signals via the electrical pathways to control actuation of the actuating beams of multiple micro-valves included in the valve body 102. The structure and function of such micro-valves are described in greater detail herein. In some embodiments, circuit board 104 itself includes a micro-controller that generates and provides control signals to actuate the micro-valves.

An identification tag 106 is attached to jetting assembly 100. In some embodiments, identification tag 106 includes an internal memory configured to store various forms of information (e.g., manufacturing information, serial number, valve calibration information, settings, etc.) regarding jetting assembly 100. For example, in one embodiment, identification tag 106 is a radio frequency identification (RFID) tag configured to transmit the stored information in a receivable manner in response to receiving a predetermined identifier from an external device. This way, information regarding jetting assembly 100 may be quickly and efficiently retrieved.

Figure 2:
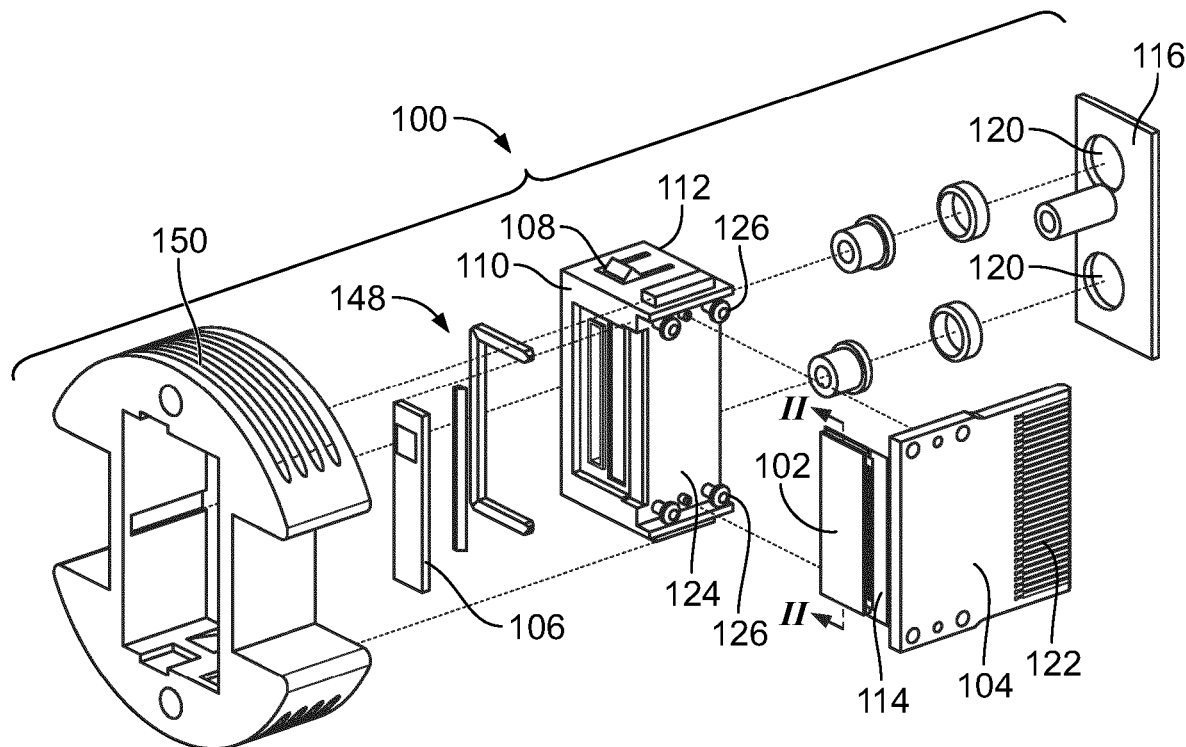
FIG. 2 is an exploded view of the jetting assembly shown in FIG. 1, according to an example embodiment.

Referring now to FIG. 2, an exploded view of jetting assembly 100 is shown, according to an example embodiment. Carrier 108 includes a front-side surface 110, a rear-side surface 112, and a side surface 124. In various embodiments, valve body 102 is attached to front-side surface 110 via an adhesive. The rear-side surface 112 has a cover 116 disposed thereon. Cover 116 includes apertures 120 providing supply ports for fluid (e.g., ink) for deposition onto a target via the valve body 102. For example, in some embodiments, fluid (e.g., ink) is supplied to the valve body 102 via a first one of the apertures 120 (e.g., via an input supply line or hose), circulated through valve body 102, and output from the valve body 102 via a second one of the apertures 120. In other words, the fluid is recirculated through the fluid reservoir. A septum may be positioned in each of the apertures 120 and configured to allow insertion of a fluid delivery or fluid return pin or needle therethrough so as to allow communication of the fluid into the fluid reservoir while maintaining fluidic sealing of the jetting assembly 100. In particular embodiments, the septum may include a single septum sheet which extends below each of the first one and the second one of the apertures. While not shown, in some embodiments, a heating element (e.g., a resistive wire) may be positioned proximate to the valve body 102 or the carrier 108 (e.g., around or coupled to side wall thereof). The heating element may be used to selectively heat the fluid (e.g., ink) contained within the fluid reservoir so as to maintain the fluid at a desired temperature. Furthermore, a temperature sensor (not shown), e.g., a thermal sense resistor, may also be provided in the carrier 108, for example, to determine a temperature of the fluid flowing through the jetting assembly 100.

The front-side surface 110 includes a cavity adapted to receive valve body 102 such that valve body 102 is mounted securely to the front-side surface 110 (e.g., via an adhesive). Circuit board 104 is attached to carrier 108 via the side surface 124. As shown, the side surface 124 includes mounting pegs 126. In various embodiments, circuit board 104 includes apertures arranged in a manner corresponding to the arrangement of the mounting pegs 126 and are adapted to receive the mounting pegs 126 to align the circuit board 104 to the carrier 108.

As shown, circuit board 104 has a flex circuit 114 attached thereto. Flex circuit 114 extends at an angle from circuit board 104 and is attached to the carrier 108 proximate to the front-side surface 110. The valve body 102 and circuit board 104 are arranged perpendicularly to one another, as the flex circuit 114 extends around a corner boundary of front-side surface 110. Circuit board 104 also includes a controller interface 122 including electrical connection members (e.g., pins) configured to receive control signals from a marking system controller.

As described herein, in various embodiments, flex circuit 114 may be disposed between a fluid manifold and the carrier 108 (e.g., between an interposer disposed between the fluid manifold and the carrier 108) to facilitate formation of electrical connections between flex circuit 114 and electrodes of the plurality of micro-valves included in valve body 102. In some embodiments, flex circuit 114 is attached to front-side surface 110 via a mounting member 148. An opening in flex circuit 114 is aligned with the septum in carrier 108 to provide a fluid inlet to a fluid plenum formed via the valve body 102.

Figure 3:
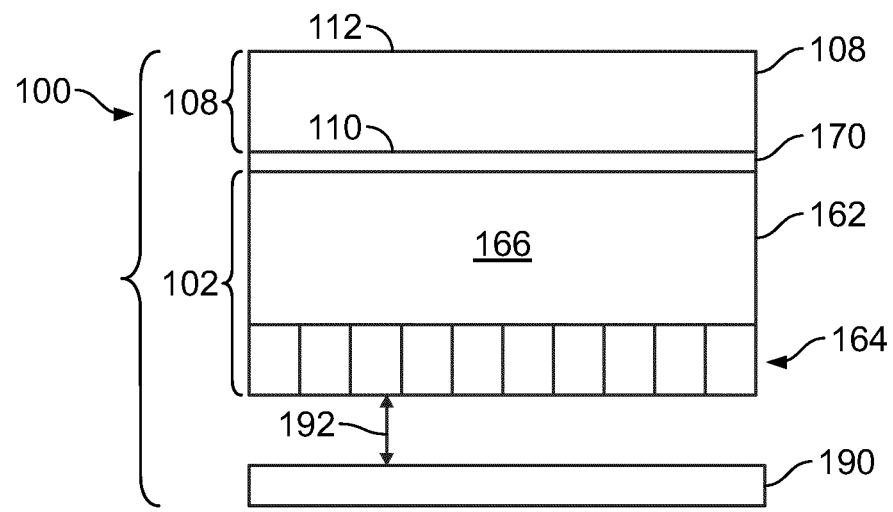
FIG. 3 is a schematic cross-sectional view of the jetting assembly shown in FIG. 1, according to an example embodiment.

Referring now to FIG. 3, a schematic depiction of various components of jetting assembly 100 is shown, according to an example embodiment. For example, FIG. 3 may depict a cross sectional view of jetting assembly 100 at the line I-I shown in FIG. 1. As shown, the valve body 102 extends from front-side surface 110 of the carrier 108 via an interposer 170. The interposer 170 provides structural support to ensure maximal performance of various components in valve body 102. While not shown, in some embodiments, a compliant layer (e.g., a silicone or rubber layer) may also be disposed above or below the interposer 170 or any other location in the stack so as to provide stress relief.

The valve body 102 includes an input fluid manifold 162 and a plurality of micro-valves 164 attached to the input fluid manifold 162. The micro-valves 164 and input fluid manifold 162 form a fluid reservoir 166 for fluid (e.g., a combination of ink and makeup fluid) received from a pressurized fluid supply (e.g., via apertures 120 in a cover 116 attached to the rear-side surface 112). In various embodiments, the fluid supply includes a fluid reservoir and a pump configured to provide pressurized fluid to jetting assembly 100 via a supply line coupled to carrier 108. In various embodiments, the fluid supply supplies fluid pressurized between 7 and 15 PSI when one or more of the micro-valves 164 are open. For example, in one embodiment, the fluid has a pressure of approximately 10 PSI. Carrier 108 may include an internal cavity configured to receive the pressurized fluid and deliver the fluid to the reservoir 166. In various embodiments, a pressure differential may be maintained between the fluid reservoir 166 and the fluid supply so as to drive the fluid out of the valve body 102.

Input fluid manifold 162 may include a glass structure including a channel forming the fluid reservoir 166. Generally, the micro-valves 164 include actuating beams formed in a device layer and held in spaced relation to orifices on an orifice plate at the front-side surface 110. The actuating beams may include at least one layer of piezoelectric material configured to deflect in response to receiving control signals (e.g., electrical voltage waveforms provided via controller interface 122 on the circuit board 104). As described herein, application of such electrical signals causes the micro-valves 164 to open, which causes droplets to be released at the orifice plate. The droplets advance a throw distance 192 onto a substrate 190 to produce a desired pattern on the substrate 190. In some embodiments, a weight of a single fluid droplet dispensed by a micro-valve 164 or any other micro-valve described herein may be in a range of 200 nanograms to 300 nanograms. In some embodiments, a volume of a single droplet dispensed may be in a range of 200 picoliter to 300 picoliter. The structure and function of various components of micro-valves 164 is described in greater detail herein. In other embodiments, the actuating beam may include a stainless steel actuating beam (e.g., having a length of approximately 1 mm). In still other embodiments, the actuating beam may include a bimorph beam having a two layers of a piezoelectric material disposed on either side of a base layer (e.g., a base silicon layer or stainless steel). An electrical signal (e.g., an electrical voltage) may be applied to either one of the piezoelectric layers so as to urge the actuating beam to bend towards the corresponding piezoelectric layer. The two piezoelectric layers may include the same piezoelectric material or different piezoelectric materials. In particular embodiments, a different electrical signal may be applied to each of the piezoelectric layer so as to bend or curve the actuating beam a predetermined distance towards or away from the orifice.

While embodiments described herein generally describe the actuating beam as including a piezoelectric material, in other embodiments, any other actuation mechanism may be used. For example, in some embodiments, the actuating beams may include a capacitive coupling for moving the actuating beams. In other embodiments, the actuating beams may include an electrostatic coupling. In still other embodiments, the actuating beams may include a magnetic coupling (e.g., an electromagnetic structure activated by an electromagnet) for moving the actuating beam. In yet other embodiments, the actuating beams may comprise a temperature sensitive bimetallic strip configured to move in response to temperature change.

Interposer 170 generally adds rigidity to various portions of the valve body 102. For example, the interposer 170 may be constructed to be more rigid than components (e.g., the orifice plate, the actuating beam, etc.) of valve body 102 to counteract stressed induced by attaching such components to one another. For example, the interposer 170 may be attached to valve body 102 to counteract stresses induced by an adhesive used to attach the carrier 108 to the valve body 102. Additionally, the interposer 170 may counteract stresses at interfaces between the input fluid manifold 162 and micro-valves 164.

Figure 4A:
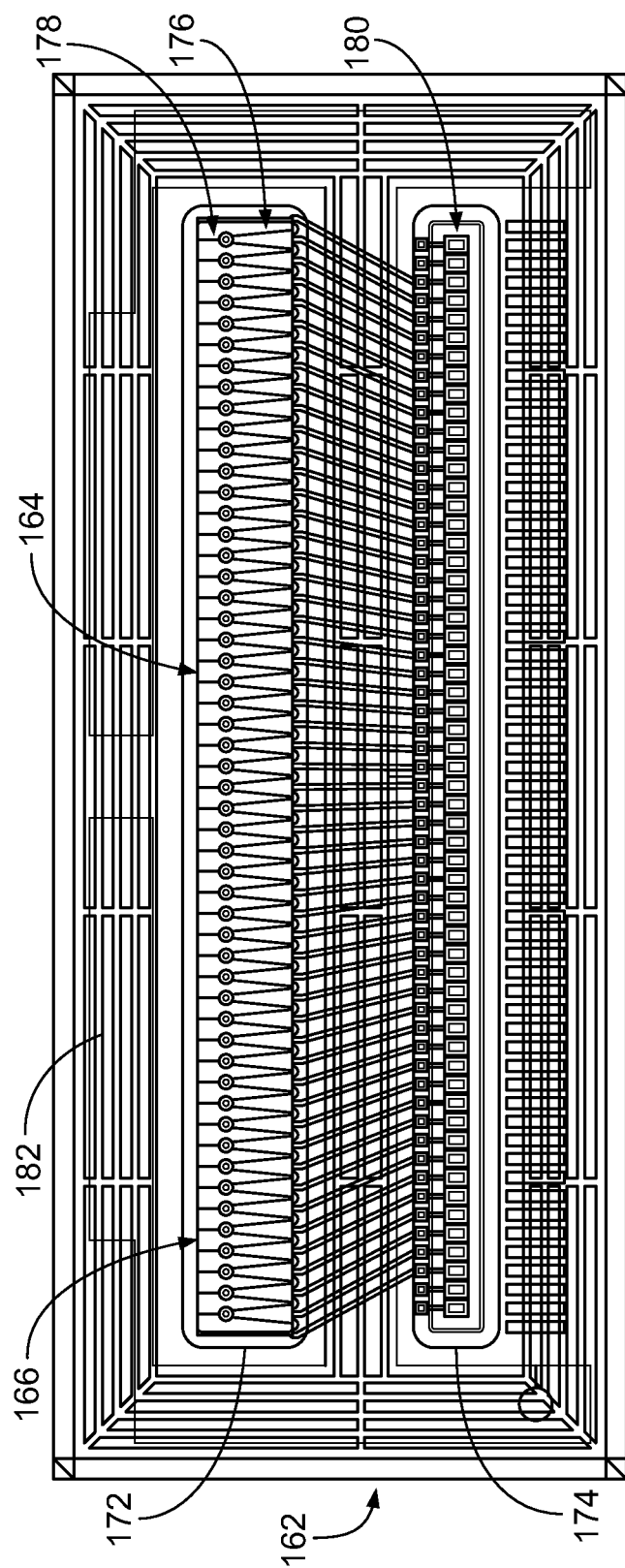
FIG. 4A is a plan view of the jetting assembly shown in FIG. 1, according to an example embodiment.

Referring now to FIG. 4A, a plan view of the jetting assembly 100 is shown, according to an example embodiment. FIG. 4A shows a plan of valve body 102 at the line II-II shown in FIG. 2. As such, FIG. 4A shows a cross-sectional view at an interface between input fluid manifold 162 and the orifice plate. Input fluid manifold 162 includes a first opening 172 and a second opening 174. The first opening 172 exposes the plurality of micro-valves 164 to form the fluid reservoir 166 configured to hold fluid received from a fluid supply.

In the example shown, the plurality of micro-valves 164 include a plurality of actuating beams 176 aligned in a single row. Each of the plurality of actuating beams 176 has a sealing member 178 disposed at an end thereof. In some embodiments, the sealing members 178 are aligned with and contact valve seats disposed at orifices in the orifice plate to prevent fluid contained in the fluid reservoir 166 from escaping the fluid reservoir 166 in the absence of any electrical signals. The jetting assembly 100 is shown to include 52 actuating beams 176 forming 52 micro-valves 164.

In various embodiments, each of the plurality of actuating beams 176 may include an electrical connection portion exposed via the second opening 174. Electrical contact pads 180 are disposed at each of the electrical connection portions. Wire bonds electrically connect each of the electrical connection portions to the controller interface 122 via electrical contact pads 180. As such, electrical signals may be received by each of the actuating beams 176 via the electrical contact pads 180. In some embodiments tape-automated bonding (TAB) may be used to electrically connect each of the electrical connection portions to the controller interface.

The boundary between the first and second openings 172 and 174 isolates the electrical contact pads 180 from the fluid contained in a reservoir formed by the fluid opening 172. Also beneficially, the electrical contact pads 180 are disposed beneath input fluid manifold 162. This means that electrical connections between actuating beams 176 are disposed on the interior of carrier 108 and are protected from deterioration and external contamination.

Figure 26:
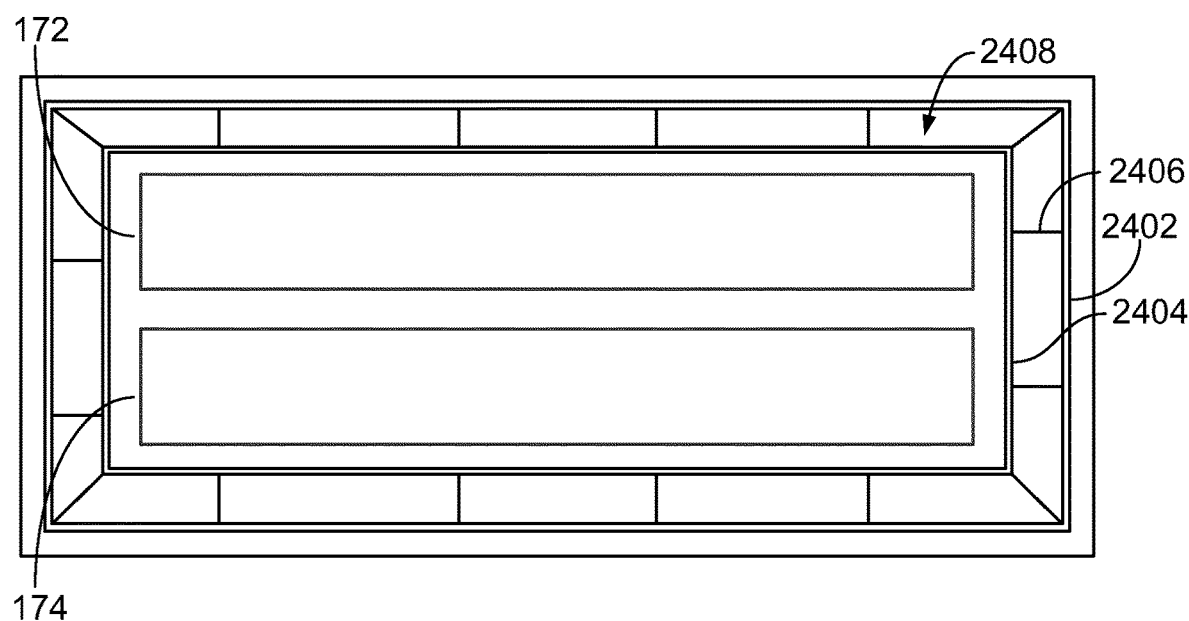
FIG. 26 is a cross sectional views of the jetting assembly shown in FIG. 1, according to an example embodiment.

To isolate electrical contact pads 180 from the fluid contained in the reservoir, an adhesive structure 182 is disposed on input fluid manifold 162. Adhesive structure 182 couples the input fluid manifold 162 to the orifice plate. As shown in FIG. 4A, adhesive structure 182 forms "racetracks" around each of the first and second openings 172 and 174. The racetracks provide barriers for fluid that seeps between the input fluid manifold 162 and the orifice plate as well as prevent particles from entering the input fluid manifold. The racetrack adhesive structure 182 may be present on one or both of the input fluid manifold 162 side or the orifice plate side. For example, the racetracks may be constructed of several concentric loops of an adhesive material (e.g., a negative photo resist such as a bisphenol-A novalac glycidyl ether based photoresist sold under the tradename SU-8 or polymethylmethacrylate, polydimethylsiloxane, silicone rubber, etc.) around each of the first and second openings 172 and 174. FIG. 26 illustrates an example of the racetracks. As shown in FIG. 26, the racetracks include an inner loop 2404 and an outer loop 2402. As illustrated, each loop is substantially rectangular. In some embodiments, the pair of loops 2402 and 2404 is segmented via adhesive connectors 2406 extending between the loops 2402 and 2404. The adhesive connectors 2406 separates the gap between the inner and outer loops 2404 and 2402 into multiple compartments so that fluid that penetrates the inner loop is trapped in a compartment formed between the inner loop and an outer loop. In other embodiments, the adhesive structure 182 may be formed from silicon and used to bond the input fluid manifold 162 to the orifice plate via fusion bonding, laser bonding, adhesives, stiction, etc. The adhesive structure 182 may be disposed on the input fluid manifold 162 and the valve body 102 coupled thereto, disposed on the valve body 102 and the input fluid manifold 162 coupled thereto, or disposed on each of the input fluid manifold 162 and the valve body 102 before coupling the two.

Figure 4B:
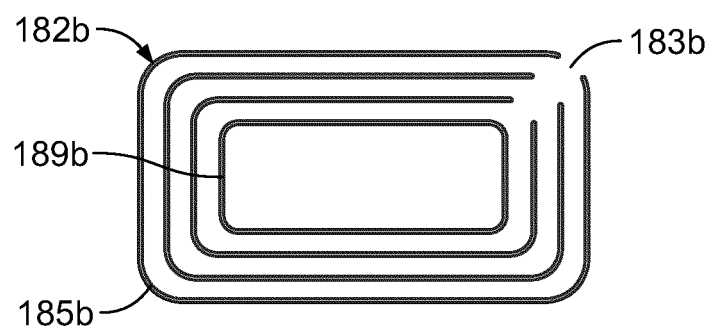
FIG. 4B is a schematic illustration of an adhesive structure that may be used in the jetting assembly of FIG. 1, according to an example embodiment.

In some embodiments, the adhesive structure 182 may be vented. For example, FIG. 4B shows a schematic illustration of an adhesive structure 182b. The adhesive structure 182b may be formed from SU-8, silicon or any other suitable material and includes a plurality of loops 189b such that the adhesive structure has a race track shape. An inner most loop of the plurality of loops 189b of the adhesive structure 182b that surrounds the input fluid manifold 162 forms a closed loop. In contrast, the remaining of the plurality of loops 189b positioned radially outwards of the inner most loop include vents 183b, for example, slots or openings defined therein. The vents 183b may facilitate bonding of input fluid manifold 162 to the orifice plate by allowing air that may get trapped in between the plurality of loops 189b of the adhesive structure 182b to escape via the vents 183b. While FIG. 4B shows the vents 183b being radially aligned with each other and located at corners of each loop, in other embodiments, one or more vents 183b of one loop may be radially offset from a vent defined in an adjacent loop and formed at any suitable location in each of the plurality of loops 189b.

As shown in FIG. 4B, corners of the each loop of the adhesive structure 182b may be rounded. Furthermore, corners of the input fluid manifold 162, the interposer 170, the flex circuit 114 or any other layers or components included in the jetting assembly 100 may be rounded, for example, to reduce stress concentration that can occur at sharp corners.

Figure 5A:
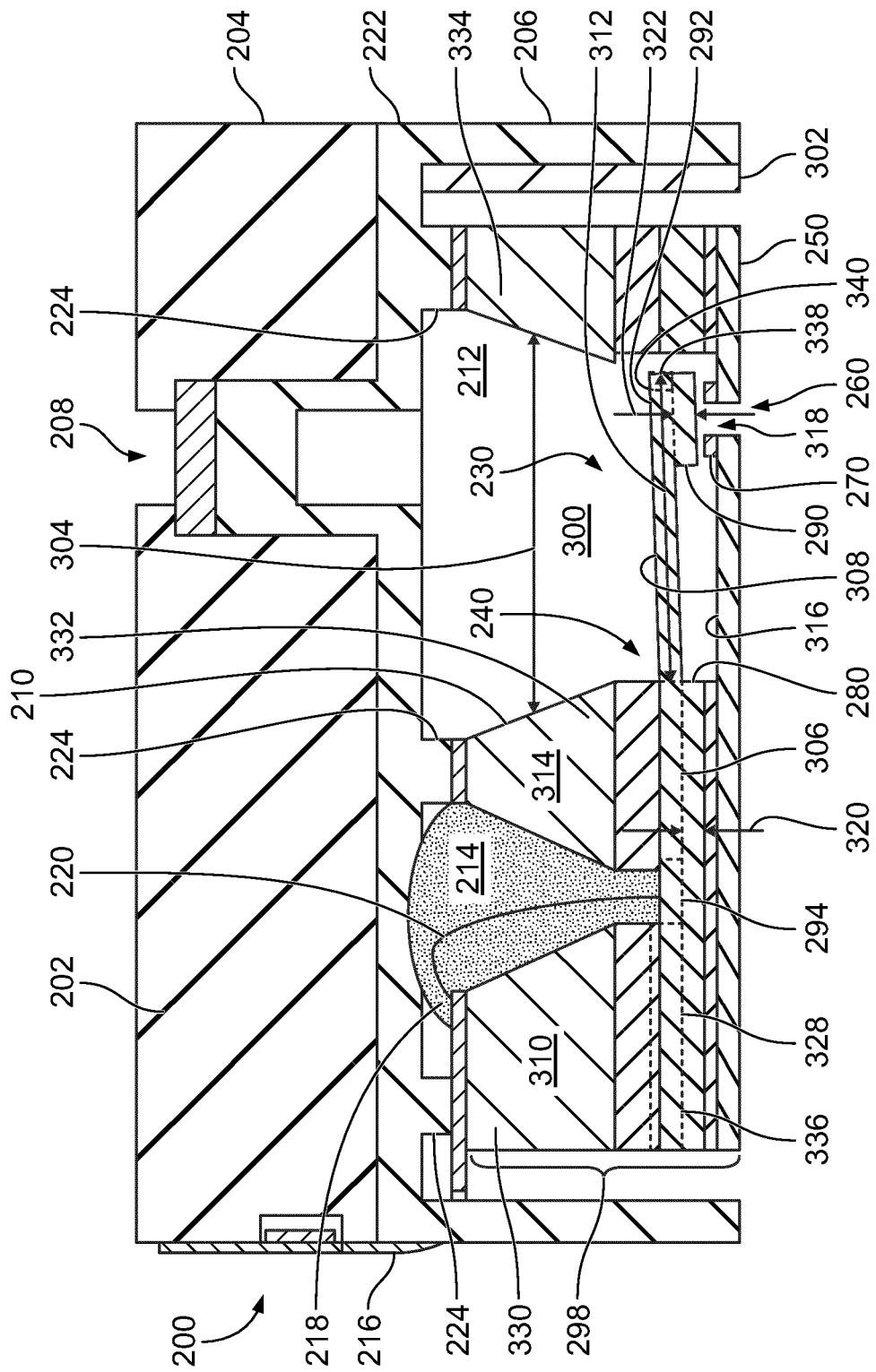
FIG. 5A is a-cross sectional view of a jetting assembly including a micro-valve, according to an example embodiment.

Referring now to FIG. 5A, a cross sectional view of a jetting assembly 200 including a micro-valve 230 is shown, according to an example embodiment. In some embodiments, jetting assembly 200 is an example embodiment of the jetting assembly 100 described with respect to FIGS. 1, 2, 3, and 4A-B. As shown, jetting assembly 200 includes a carrier 202 attached to a valve body 298 via a structural layer 222. In some embodiments, the carrier 202 may include the structural layer 222.

Carrier 202 includes an upper portion 204 and a housing portion 206 extending from an edge of upper portion 204. Upper portion 204 includes a septum 208 by which pressurized ink is provided. Housing portion 206 defines a cavity into which the valve body 298 is disposed. Valve body 298 includes an input fluid manifold 210 and the micro-valve 230. As shown, input fluid manifold 210 and micro-valve 230 define a reservoir 300 configured to hold a volume of pressured fluid received from an external fluid supply via septum 208. In various embodiments, the pressurized fluid held within the reservoir 300 is a combination of an ink and additional fluids in a liquid state.

Carrier 202 may be formed of plastic, ceramic, or any other suitable material. Carrier 202 facilitates operation of the jetting assembly 200 by providing structural support to valve body 298. For example, in some embodiments, peripheral edges of valve body 298 are attached to housing portion 206 via layers of adhesive 302 disposed at the inner surface of housing portion 206. Such adhesive facilitates maintenance of a desired relative positioning between micro-valve 230 and input fluid manifold 210.

In various embodiments, input fluid manifold 210 is pre-formed prior to its attachment to the additional components of the jetting assembly 200. Input fluid manifold 210 is formed by a body 310 (e.g., formed from glass, silicon, silica, etc.) having any suitable thickness (e.g., 500 microns). As shown, input fluid manifold 210 is pre-formed to include a first arm 330, a second arm 332, and a third arm 334. As used herein, the term "arm," when used to describe the input fluid manifold 210, is used to describe a structure separating openings contained in the input fluid manifold 210. As such, the arms 330, 332, and 334 may have any suitable shape. For example, in some embodiments, the arms 330, 332, and 334 are substantially rectangular-shaped, having substantially planar side surfaces. In other embodiments, the side surfaces may be angled such that the arms 330, 332, and 334 are substantially trapezoidal-shaped. The arms 330, 332, and 334 may be formed by creating openings in a structure (e.g., a silicon or glass structure) using any suitable method (e.g., wet etching or dry etching such as deep reactive ion etching).

As shown, a first channel 212 separates the arms 330 and 332 from one another and a second channel 214 separates the arms 332 and 334 from one another. The first and second channels 212 and 214 are substantially linear and parallel to one another in the shown embodiment, but input fluid manifold 210 may be arranged as needed for the arrangement of micro-valves to be disposed thereon. First channel 212 is formed to have a width 304 bearing a predetermined relationship to a length 312 of a cantilevered portion 308 of an actuating beam 240 of the micro-valve 230, for example, in a range of about 500-1,000 microns. For example, first channel 212 may be formed to have a width 304 greater than a desired length 312 of cantilevered portion 308 by a threshold amount. Second channel 214 provides an avenue for an electrical connection to be formed between the actuating beam 240 and a flex circuit 216 via wire bonds 220 extending in between. Beneficially, using such an arrangement internalizes electrical connections between actuating beam 240 and flex circuit 216. In other words, electrical connections between such components are not external to carrier 202, and are thus less vulnerable to degradation. In various embodiments, the first channel 212 and/or the second channel 214 may have inclined sidewalls.

As shown, second channel 214 is substantially filled with an encapsulant 218. Encapsulant 218 may include an epoxy-type or any other suitable material. Encapsulant 218 envelopes electrical connections formed between wire bonds 220, the flex circuit 216, and actuating beam 240 and is configured to protect the wire bonds 220 from physical damage, moisture and corrosion. Thus, encapsulant 218 ensures the maintenance of an adequate electrical connection between flex circuit 216 and actuating beams 240 to facilitate providing electrical control signals to actuating beams 240 to cause movement thereof to open and close micro-valve 230.

The second arm 332 serves as a barrier preventing fluid contained in the reservoir 300 from reaching the electrical connections. As such, input fluid manifold 210 serves as both part of the reservoir 300 for pressured fluid received from an external fluid supply and an insulating barrier between the pressured fluids and any electrical connections contained within jetting assembly 200. First and second channels 212 and 214 may be formed using any suitable process (e.g., via sandblasting, physical or chemical etching, drilling, etc.). In some embodiments, rather than being constructed of glass, input fluid manifold 210 is constructed of silicon, silica, ceramics or any other suitable material. In some embodiments, the input fluid manifold 210 may be bonded to the micro-valve 230 via glass frit, solder or any other suitable adhesive.

With continued reference to FIG. 5A, micro-valve 230 includes an orifice plate 250 attached to actuating beam 240. The orifice plate 250 may be formed from any suitable material, for example, glass, stainless steel, nickel, nickel with another layer of electroplated metal (e.g., stainless steel), polyimide (e.g., kapton) or a negative photoresist (e.g., SU-8, polymethylmethacrylate, etc.). Orifice plate 250 is substantially planar and includes an orifice 260 extending between surfaces thereof. In some embodiments, the orifice plate 250 may be substantially flat, for example, have a flatness with a coefficient of variance of less than 3 microns over a length and width of the orifice plate 250 of at least 15 mm, such that the orifice plate 250 is substantially free of bow or twist. Furthermore, the orifice plate 250 may have any suitable thickness. In some embodiments, the orifice plate 250 may have a thickness in a range of 30 microns to 60 microns (30, 40, 50, or 60 microns). In other embodiments, the orifice plate 250 may have a thickness in a range of 100 microns to 400 microns (e.g., 100, 150, 200, 250, 300, 350, or 400 microns). Thicker orifice plates 250 may facilitate realization of a flatter orifice plate.

In various embodiments, the orifice 260 is substantially cylindrical-shaped and has a central axis that is perpendicular or substantially perpendicular to surfaces of orifice plate

250. A valve seat 270 is disposed on an internal surface 316 of orifice plate 250 proximate to orifice 260. In various embodiments, valve seat 270 comprises a compliant material that surrounds or substantially surrounds orifice 260. In some embodiments, valve seat 270 is constructed from an epoxy-based adhesive such as an SU-8 photoresist. In other embodiments, the valve seat may be formed from a moldable polymer, for example, polydimethylsiloxane or silicone rubber. In still other embodiments, the valve seat 270 may be formed from a non-compliant material such as silicon. In some embodiments, a compliant layer, for example, a gold layer may be disposed on a surface of the valve seat 270 which is contacted by the actuating beam 240. Valve seat 270 defies an interior opening 318 substantially aligned with orifice 260 to create an outlet for pressured fluid contained in the reservoir 300. In particular embodiments, the valve seat 270 might be excluded.

As shown, the actuating beam 240 extends a distance between a first end 336 and a second end 338. Actuating beam 240 includes an end portion 328 extending from the first end 336 to a boundary of the second channel 214. As shown, the end portion 328 is attached (e.g., via an adhesive layer) to the input fluid manifold 210 via a surface of the first arm 330. The end portion 328 is disposed on spacing member 280. As such, the end portion 328 is located between the spacing member 280 and the first arm 330. In various embodiments, the end portion 328 includes each of the layers described with respect to FIGS. 7A-B extending continuously therethrough. However, in alternative embodiments, any of the layers described with respect to FIGS. 7A-B may not be included or include any number of discontinuities within the end portion 328.

Actuating beam 240 further includes an electrical connection portion 294 extending from the end portion 328. As shown, the electrical connection portion 294 extends in a region that corresponds to the second channel 214. In other words, electrical connection portion 294 is located between the spacing member 280 and the channel 214. As shown, the wire bond 220 connects to the actuating beam 240 via the electrical connection portion 294. As described herein, the actuating beam 240 has a wire bond pad disposed thereon at the electrical connection portion 294 to form an electrical connection. Via the electrical connection, an electrical signal originating from an external controller travels to the actuating beam 240 via the flex circuit 216 and wire bond 220. As described herein, the electrical signal may result in movement of a cantilevered portion 308 of the actuating beam 240 from a default position. Such a movement may open the fluid outlet defined at the orifice 260 such that fluid contained in the reservoir 300 is ejected from the valve body 298 and onto a desired surface. Various aspects of the electrical connection portion 294 are structured to facilitate operation of the micro-valve 230 in response to the electrical signal.

Actuating beam 240 further includes a base portion 306 extending from the electrical connection portion 294 to a boundary of the second arm 332. As such, input fluid manifold 210 is attached to the actuating beam 240 via an adhesive disposed between the base portion 306 and the second arm 332. In some embodiments, each of the layers described with respect to FIGS. 7A-B extends continuously through the base portion 306. In alternative embodiments, one or more of the layers described with respect to FIGS. 7A-B may not be present within the base portion 306. For example, in one embodiment, the passivation structure 406 and the second electrode portion 404 are not present within the base portion 306. In such an embodiment, the adhesive attaching the actuating beam 240 to the second arm 332 directly contacts the layer of piezoelectric material within the base portion 306. Alternatively, or additionally, any of the layers described with respect to FIGS. 7A-B may include one or more discontinuities (e.g., gaps) within the base portion 306.

The cantilevered portion 308 extends from the base portion 306 into the reservoir 300. Since the base portion 306 is disposed on a spacing member 280, the cantilevered portion 308 is spatially separated from orifice plate 250. Thus, since the cantilevered portion 308 extends into the reservoir 300, there is space on either side of cantilevered portion 308 such that it may bend towards and/or away from the orifice plate 250 as a result of application of the electrical charge thereto via electrical connection portion 294. The spacing member 280 is configured to prevent squeeze film damping of the actuating beam.

Cantilevered portion 308 has a length 312 such that the cantilevered portion 308 extends from a boundary of the reservoir 300 by a predetermined distance. In various embodiments, the predetermined distance is specifically selected such that a portion 292 of cantilevered portion 308 overlaps the valve seat 270 and orifice 260. A sealing member 290 extends from the portion 292 of the actuating beam 240 overlapping orifice 260. In some embodiments, the sealing member 290 is constructed to have a shape that substantially corresponds to a shape of the orifice 260. For example, in one embodiment, both orifice 260 and sealing member 290 are substantially cylindrical-shaped, with sealing member 290 having a larger outer diameter. Such a configuration facilitates sealing member 290 covering orifice 260 in its entirety to enable a seal to be formed between sealing member 290 and valve seat 270. In other embodiments, the orifice 260 may have any other shape, e.g., star shape, square, rectangular, polygonal, elliptical or an asymmetric shape. In particular embodiments, the valve seat 270 may define a recess size and shaped to receive the sealing member 290. In various embodiments, the orifice plate 250 and therefore, the orifice 260 may be formed from a non-wetting (e.g., hydrophobic) material such as silicon or Teflon. In other embodiments, a non-wetting (e.g., hydrophobic) coating may be disposed on an inner wall of the orifice 260. Such coatings may include, for example, Teflon, nanoparticles, an oleophilic coating or any other suitable coating.

In various embodiments, spacing member 280 and sealing member 290 are constructed of the same materials (e.g., silicon, SU-8, silicon rubber, polymethylmethacrylate, etc.) and have equivalent or substantially equivalent thicknesses 320 and 322. In such embodiments, when actuating beam 240 extends parallel to orifice plate 250, lower surfaces of spacing member 280 and sealing member 290 are aligned with one another. When actuating beam 240 is placed into a closed position (as described herein), a surface of sealing member 290 contacts valve seat 270 to close the fluid outlet formed at orifice 260 (e.g., a sealing surface of the sealing member 290 may be configured to extend approximately 2 microns beneath a lower surface of spacing member 280 if the valve seat 270 was not present). Valve seat 270 and sealing member 290 may be dimensioned such that sufficient surface area of the sealing member 290 contacts valve seat 270 when actuating beam 240 is placed in the closed position (e.g., when an electrical signal is removed from or applied to the actuating beam 240 via wire bonds 220) to prevent fluid from traveling from reservoir 300 to orifice 260. For example, the sealing member 290 may have a larger diameter or otherwise cross-section than the valve seat 270.

In some embodiments, a compliant material (e.g., a gold layer) maybe disposed on a surface of the sealing member 290 that is configured to contact the valve seat 270.

Various aspects of the structure of the cantilevered portion 308 are constructed to maximize the durability of the micro-valve 230. In some embodiments, the second electrode portion 404 described with respect to FIGS. 7A-B extends continuously through substantially the entirety of the cantilevered portion 308. Such a structure provides maximal overlap between the second electrode and a layer of piezoelectric material within the cantilevered portion 308 such that electric charge may be applied to substantially the entirety of the cantilevered portion 308 to maximize the piezoelectric response. Because the cantilevered portion 308 extends into the reservoir 300, the fluid contained within the reservoir 300 will contact the actuating beam 240. The fluid contained within the reservoir 300 (e.g., any suitable combination of ink and makeup fluid) may corrode various materials out of which the actuating beam 240 is constructed. For example, in some embodiments, the electrodes contained in the actuating beam (e.g., the second electrode in the second electrode portion 404 described with respect to FIGS. 7A-B) may be constructed of a material (e.g., platinum or gold) that corrodes in response to contact with the fluid. Thus, to ensure durability of the micro-valve, steps are taken to isolate the electrodes from the fluid. For example, the passivation structure 406 described with respect to FIGS. 7A-B may be disposed on the second electrode such that the passivation structure 406 completely covers the second electrode.

To allow this to occur, the actuating beam 240 may be constructed such that a delimiting (e.g., outer circumferential) boundary of the second electrode is disposed inward of a delimiting boundary of the actuating beam 240. For example, the layer of piezoelectric material contained within the actuating beam 240 may extend outward of the second electrode, and the passivation structure 406 may be disposed on the second electrode such that the passivation structure 406 completely covers the second electrode. In other words, an end 340 of the cantilevered portion 308 may not include the second electrode layer to facilitate complete passivation of the actuating beam 240.

Various aspects of jetting assembly 200 are designed to ensure formation of an adequate seal between valve seat 270 and sealing member 290. For example, structural layer 222 disposed on input fluid manifold 210 prevents bowing of orifice plate 250 resulting from stressed induced thereon via adhesives coupling components of micro-valve 230 to one another and the micro-valve 230 to housing portion 206. In various embodiments, structural layer 222 is constructed to have a greater rigidity than orifice plate 250 to perform this function. Structural layer 222 may be constructed of silicon or any other suitable material. As shown, structural layer 222 includes protruding portions 224 extending from a main portion thereof. Protruding portions 224 are attached to an upper surface of input fluid manifold 210 (e.g., at boundaries of first and second channels 212 and 214). In certain embodiments, protruding portions 224 are omitted. A seal is formed at protruding portions 224 via, for example, an adhesive disposed between structural layer 222 and flex circuit 216. Protruding portions 224 provide clearance above the input fluid manifold 210. Such clearance facilitates disposal of encapsulant 218 that completely covers all points of contact between wire bond 220 and flex circuit 216. In some embodiments, the carrier 202 may include the structural layer 222 such that the stiffness is provided by the carrier 202.

In another aspect, actuating beam 240 is constructed such that a tight seal is formed at the interface between the valve seat 270 and the sealing member 290 when in the closed position. Actuating beam 240 may include at least one layer of piezoelectric material. The layer of piezoelectric material may include lead zirconate titanate (PZT) or any suitable material. The layer of piezoelectric material has electrodes electrically connected thereto. In various embodiments, wire bonds 220 are attached to said electrodes such that electrical signals from flex circuit 216 are provided to the layer of piezoelectric material via the electrodes. The electrical signals cause the actuating beam 240 to move (e.g., bend, turn, etc.) with respect to its default position. In other embodiments, the actuating beam 240 may include a stainless steel actuating beam (e.g., having a length of approximately 1 mm). In still other embodiments, the actuating beam 240 may include a bimorph beam having a two layers of a piezoelectric material disposed on either side of a base layer (e.g., a base silicon layer). An electrical signal (e.g., an electrical voltage) may be applied to either one of the piezoelectric layers so as to urge the actuating beam 240 to bend towards the corresponding piezoelectric layer. The two piezoelectric layers may include the same piezoelectric material or different piezoelectric materials. In particular embodiments, a different electrical signal may be applied to each of the piezoelectric layer so as to bend or curve the actuating beam a predetermined distance.

As shown, wire bonds 220 are attached to actuating beam 240 at an electrical connection portion 294 thereof. Electrical connection portion 294 includes a wire-bonding pad (e.g., constructed of gold or platinum) conductively connected to at least one electrode within actuating beam 240. Beneficially, electrical connection portion 294 is separated from the cantilevered portion of actuating beam 240. In other words, electrical connection portion 294 is separated from the fluid contained in jetting assembly 200 via seals formed at the points of connection between input fluid manifold 210 and actuating beam 240. In some embodiments, the wire bonds 220 and/or the encapsulant 218 may be routed out through an opening provided in the orifice plate 250.

In various embodiments, actuating beam 240 is constructed such that the closed position is its default position. In other words, various layers in the actuating beam 240 are constructed such that the actuating beam curves towards orifice 260 as a result of force supplied via pressured fluid contained in the fluid reservoir. A tuning layer within actuating beam 240 may be constructed to be in a state of compressive stress to cause a curvature in actuating beam towards the orifice. As a result of such curvature, sealing member 290 contacts valve seat 270, for example, in the absence of any electrical signals applied to the actuating beam 240 to close the fluid plenum. The degree of curvature may be specifically selected to form a tight seal at the interface between sealing member 290 and valve seat 270 with the actuating beam 240 in the default position. Beneficially, such a default seal prevents evaporation of the fluid contained in jetting assembly 200, which prevents clogging and other defects.

The actuating beam 240, as shown in FIG. 5A, is bent away from orifice plate 250. Accomplishment of such a bend results from application of an electrical signal to actuating beam 240 via flex circuit 216. For example, flex circuit 216 may be electrically connected to an external controller supplying electrical signals relayed to actuating beam 240.

As illustrated by FIG. 5A, application of the electrical signal causes the actuating beam 240 to temporarily depart from its default position. For example, in various embodiments, the actuating beam 240 moves upward away from orifice 260 such that a portion of a sealing member surface of sealing member 290 is at least 10 microns from an upper surface of valve seat 270. In one embodiment, a central portion of the sealing member surface is approximately 15 microns from the valve seat 270 at a peak of its oscillatory pattern. As a result, an opening is temporarily formed between valve seat 270 and sealing member 290. The opening provides a pathway for a volume of fluid to enter micro-orifice 260 to form a droplet at an exterior surface of the orifice plate 250. The droplets are deposited onto a substrate to form a pattern determined via the control signals supplied to each of the actuating beams 240 of each of the micro-valves 230 of jetting assembly 200. As will be appreciated, the frequency with which the actuating beam 240 departs from its default position to a position such as the one shown in FIG. 5A may vary depending on the implementation. For example, in one embodiment, the actuating beam 240 oscillates at a frequency of approximately 12 kHz. However, the actuating beam 240 may oscillate at a smaller (e.g., 10 kHz) or larger frequency (e.g., 20 kHz) in other implementations.

Referring now to FIG. 5B, a cross sectional view of a jetting assembly 200b including a micro-valve 230b is shown, according to an example embodiment. In some embodiments, jetting assembly 200b is an example embodiment of the jetting assembly 100 described with respect to FIGS. 1, 2, 3, and 4A-B. As shown, jetting assembly 200b includes a carrier 202b attached to a valve body 298b via an interposer 222b.

Carrier 202b includes an upper portion 204b and a housing portion 206b extending from an edge of upper portion 204b. A fluid channel 211b is provided in the upper portion 204b. A septum 208b (e.g., a rubber or foam septum) is positioned at an inlet of the fluid channel 211b and a filter 213b is positioned at an outlet of the fluid channel 211b. A cover 203b (e.g., a plastic or glass cover) is positioned on the carrier 202b such that the septum 208b is positioned between the carrier 202b and the cover 203b, and secured therebetween. An opening 209b may be defined in the cover 203b and corresponds to the inlet of the fluid channel 211b. A fluid connector 10b is coupled to the cover 203b or the inlet of the fluid channel 211b. The fluid connector 10b includes an insertion needle 12b configured to pierce the septum 208b and be disposed therethrough in the fluid channel 211b. The fluid connector 10b is configured to pump pressurized fluid (e.g., ink) into an input fluid manifold 210b of the jetting assembly 200b via the insertion needle 12b. Furthermore, the filter 213b is configured to filter particles from the fluid before the fluid is communicated into the reservoir 300b. While not shown, in some embodiments, a second opening may be defined in the cover 203b to allow a return path for the pressurized fluid out of the carrier 202b, for example, to allow fluid to be recirculated through the reservoir 300b. In such embodiments, a second septum may be positioned in the second opening and configured to receive, for example, a return needle coupled to a second fluid connector. The second fluid connector may be coupled to a fluid return line configured to recirculate the fluid back to, for example, a bulk fluid reservoir. In some embodiments, the insertion needle 12b may be formed from or coated with a non-wetting (e.g., a hydrophobic material such as Teflon). In other embodiment, the insertion needle 12b may include heating elements, or an electric current may be provided to the insertion needle 12b so as to heat the insertion needle 12b and thereby, the fluid flowing therethrough into the input fluid manifold 210b. In still other embodiments, metallic needles or any other heating element may be provided in the input fluid manifold 210b for heating the fluid contained therein. While shown as only including the fluid channel 211b, in some embodiments, the carrier 202b may also define a second fluid channel for allowing the fluid to be drawn out of the carrier 202b, i.e., cause the fluid to be circulated through the carrier 202b.

The housing portion 206b defines a cavity or a boundary within which the valve body 298b is disposed. Valve body 298 includes the input fluid manifold 210b and the micro-valve 230b. As shown, input fluid manifold 210b and micro-valve 230b define the fluid reservoir 300b configured to hold a volume of pressured fluid received from an external fluid supply via the septum 208b. In various embodiments, the pressurized fluid held within the fluid reservoir 300b is a combination of an ink and additional fluids in a liquid state.

In various embodiments, input fluid manifold 210b is pre-formed prior to its attachment to the additional components of the jetting assembly 200b. Fluid manifold 210b may be formed by a glass body 310b having any suitable thickness (e.g., 500 microns). As shown, input fluid manifold 210b is pre-formed to include a first channel 212b and a second channel 214b. First channel 212b is formed to have a width 304b bearing a predetermined relationship to a length 312b of a cantilevered portion 308b of an actuating beam 240b of the micro-valve 230b. Second channel 214b provides an avenue for an electrical connection to be formed between the actuating beam 240b and a flex circuit 216b via wire bonds 220b extending in between.

As shown, second channel 214b is substantially filled with an encapsulant 218b. The encapsulant 218b ensures the maintenance of an adequate electrical connection between flex circuit 216b and actuating beams 240b to facilitate providing electrical control signals to actuating beams 240b to cause movement thereof to open and close micro-valve 230b, and protects a wire-bond 220b from physical damage or moisture, as previously described herein.

The portion 314b of input fluid manifold 210b separating the first and second channels 212b and 214b serves as a barrier preventing fluid contained in the reservoir 300b from reaching the electrical connections. As such, input fluid manifold 210b serves as both part of the reservoir 300b for pressurized fluid received from an external fluid supply and an insulating barrier between the pressured fluids and any electrical connections contained within jetting assembly 200b.

The micro-valve 230b includes an orifice plate 250b attached to actuating beam 240b. Orifice plate 250b is substantially planar and includes an orifice 260b extending between surfaces thereof. A valve seat 270b is disposed on an internal surface 316b of orifice plate 250b proximate to orifice 260b. Valve seat 270b defies an interior opening 318b substantially aligned with orifice 260b to create an outlet for pressurized fluid contained in the reservoir 300b. In particular embodiments, the valve seat 270b might be excluded. In some embodiments, the orifice plate 250b or any other orifice plate described herein may also be grounded. For example, an electrical ground connector 295b (e.g., a bonding pad such as a gold bond pad) may be provided on the orifice plate 250b and configured to allow the orifice plate 250b to be electrically ground (e.g., via electrical coupling to a system ground).

The actuating beam 240b includes a base portion 306b and a cantilevered portion 308b. Base portion 306b extends underneath the portion 314b of input fluid manifold 210b separating the first and second channels 212b and 214b. As shown, the base portion 306b includes an electrical connection portion 294b in a region that overlaps with the second channel 214b. Electrical connection portion 294b includes an electrode through which an electrical connection is formed with flex circuit 216b via wire bonds 220b. The cantilevered portion 308b extends into the reservoir 300b from the portion 314b of input fluid manifold 210b. As shown, cantilevered portion 308b is disposed on a spacing member 280b and, as a result, is spatially separated from orifice plate 250b.

Cantilevered portion 308b has a length 312b such that the cantilevered portion extends from a boundary of the reservoir 300b by a predetermined distance. In various embodiments, the predetermined distance is specifically selected such that a portion 292b of cantilevered portion 308b overlaps the valve seat 270b and orifice 260b. A sealing member 290b extends from the portion 292b of the actuating beam 240b overlapping the orifice 260b. In some embodiments, sealing member 290b is constructed to have a shape that substantially corresponds to a shape of orifice 260b.

The flex circuit 216b is positioned on the glass body 310b and the portion 314b of the input fluid manifold 210b, and coupled thereto via a first adhesive layer (e.g., SU-8, silicone rubber, glue, epoxy, etc.). An interposer 222b is positioned between the upper portion 204b of the carrier 202b and the input fluid manifold 210b so as to create gap between the upper portion 204b and the input fluid manifold 210b. This allows sufficient space for disposing the encapsulant 218b and increases a volume of the input fluid manifold 210b. As shown in FIG. 5B, the interposer 222b is positioned on and coupled to a portion of the flex circuit 216b via a second adhesive layer 223b (e.g., SU-8, silicone, or any other adhesive). Furthermore, the interposer 222b is coupled to a side wall of the upper portion 204b of the carrier 202b proximate to the micro-valve 230b via a third adhesive layer 225b (e.g., SU-8, silicone, or any other adhesive).

The interposer 222b may be formed from a strong and rigid material (e.g., plastic, silicon, glass, ceramics, etc.) and disposed on input fluid manifold 210b so as to prevent bowing of the orifice plate 250b resulting from stressed induced thereon via adhesives coupling components of micro-valve 230b to one another and the micro-valve 230b to housing portion 206b. In various embodiments, interposer 222b is constructed to have a greater rigidity than orifice plate 250b to perform this function.

In another aspect, actuating beam 240b is constructed such that a tight seal is formed at the interface between valve seat 270b and sealing member 290b when in the closed position. Actuating beam 240b may include at least one layer of piezoelectric material (e.g., lead zirconate titanate (PZT) or any suitable material). The layer of piezoelectric material has electrodes electrically connected thereto and wire bonds 220b are attached to said electrodes such that electrical signals from flex circuit 216b are provided to the layer of piezoelectric material via the electrodes. The electrical signals cause the actuating beam 240b to move (e.g., bend, turn, etc.) with respect to its default position.

As shown, wire bonds 220b are attached to actuating beam 240b at an electrical connection portion 294b thereof, substantially similar to the wire bonds 220 described with respect to the jetting assembly 200 of FIG. 5A. In various embodiments, actuating beam 240b is constructed such that the closed position is its default position, as described in detail with respect to the actuating beam 240 of FIG. 5A.

The actuating beam 240b, as shown in FIG. 5B, is bent away from orifice plate 250b. Accomplishment of such a bend results from application of an electrical signal to actuating beam 240b via flex circuit 216b. For example, flex circuit 216b may be electrically connected to a circuit board 215b (e.g., a printed circuit board) extending perpendicular to a longitudinal axis of the actuating beam 240b along a sidewall of the carrier 202b. An identification tag 217b (e.g., the identification tag 106) may be positioned between the circuit board 215b and the sidewall of the carrier 202b. An electrical connector 219b is electrically coupled to the circuit board 215b and configured to electrically connect the flex circuit 216b to an external controller supplying electrical signals relayed to actuating beam 240b via the circuit board 215b.

As illustrated by FIG. 5B, application of the electrical signal causes the actuating beam 240b to temporarily depart from its default position. For example, in various embodiments, the actuating beam 240b moves upward away from orifice 260b such that a portion of a sealing member surface of sealing member 290b is at least 10 microns from an upper surface of valve seat 270b, as described in detail with respect to the actuating beam 240 of FIG. 5A.

Figure 6:
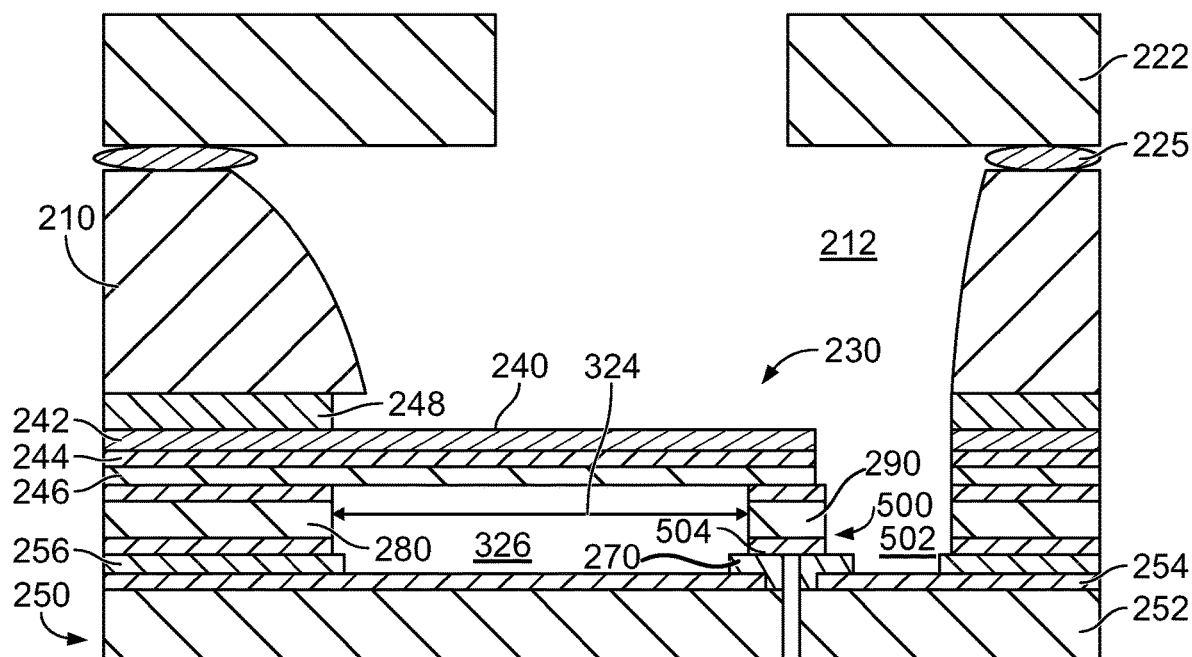
FIG. 6 is cross-sectional view providing a more detailed view of the jetting assembly shown in FIG. 5A, according to an example embodiment.

Referring now to FIG. 6, a more detailed view showing various components of jetting assembly 200 described with respect to FIGS. 5A-B is shown, according to an exemplary embodiment. As shown, actuating beam 240 includes an actuating portion 242, a tuning layer 244, and a non-active layer 246. Non-active layer 246 serves as a base for the tuning layer 244 and the actuating portion 242. The structure of actuating portion 242 and the tuning layer 244 are described in greater detail with respect to FIGS. 7A-B. In some embodiments, non-active layer 246 is constructed from silicon or other suitable material. In some embodiments, non-active layer 246, the spacing member 280, and sealing member 290 are all constructed from the same material (e.g., monolithically formed from a silicon wafer). In an example embodiment, non-active layer 246, the spacing member 280, and sealing member 290 are formed from a double silicon-on-insulator (SOI) wafer. The SOI wafer may comprise a first silicon layer located between a first silicon dioxide layer silicon dioxide and a second silicon dioxide layer, a second silicon layer located between the second silicon dioxide layer and a third silicon dioxide layer, and a base layer located below the third silicon dioxide layer. In some embodiments, the base layer comprises may be removed such that the third silicon dioxide layer is coupled to the orifice plate 250. Furthermore, at least the cantilevered portion 308 comprises the second silicon dioxide layer, the second silicon layer and the third silicon dioxide layer.

Spacing member 280 is shown to include an intermediate layer located or interposed between two peripheral layers. In an example embodiment, the intermediate layer and non-active layer 246 comprise two silicon layers of a double SOI wafer, with the peripheral layers disposed on either side of the intermediate layer including silicon oxide layers. In this example, the sealing member 290 and spacing member 280 are formed through etching the surface of the double SOI wafer opposite the actuating portion 242. Oxide layers serve to control or stop the etching process once, for example, the entirety of the intermediate layer forming the spacing member 280 is removed in a region separating the spacing member 280 and sealing member 290. Such a process provides precise control over both the width and thickness of the spacing and sealing members 280 and 290.

As will be appreciated, the size of sealing member 290 may contribute to the resonance frequency of actuating beam 240. Larger amounts of material disposed at or near an end of actuating beam 240 generally results in a lower resonance frequency of actuating beam. Additionally, such larger amounts of material may impact the actuating beam 240's default curvature induced from pressurized fluid contacting actuating beam 240. Accordingly, the desired size of sealing member 290 impacts various other design choices of actuating beam 240. Such design choices are described in greater detail with respect to FIGS. 7A-B. In some embodiments, the sealing member 290 is sized based on the dimensions of orifice 260. In some embodiments, the sealing member 290 is substantially cylindrical and has a diameter approximately 1.5 times that of the orifice 260. For example, in one embodiment, sealing member 290 has a diameter of approximately 90 microns when the orifice 260 has a diameter of approximately 60 microns. Such a configuration facilitates alignment between sealing member 290 and orifice 260 such that sealing member 290 completely covers orifice 260 upon contacting valve seat 270. In another embodiment, the sealing member 290 is sized such that it has a surface area that approximately doubles that of the orifice 260 (e.g., the spacing member 280 may have a diameter of approximately 150 microns, with the orifice 260 being approximately 75 microns in diameter). Such an embodiment provides greater tolerance for aligning sealing member 290 and orifice 260 to facilitate creating the seal between valve seat 270 and sealing member 290. In other embodiments, the diameter of the sealing member 290 may be 2 times, 2.5 times, 3 times, 3.5 times or 4 times the diameter of the orifice 260. In various embodiments, a ratio of a length to diameter of the orifice 260 may be in range of 1:1 to 15:1. The ratio may influence shape, size and/or volume of a fluid droplet ejected through the orifice and may be varies based on a particular application.

Beneficially, the gap 324 between spacing member 280 and sealing member 290 creates a volume of separation 326 between actuating beam 240 and orifice plate 250. The volume of separation 326 prevents squeeze film damping of oscillations of actuating beam 240. In other words, insufficient separation between orifice plate 250 and actuating beam 240 would lead to drag resulting from fluid having to enter and/or exit the volume of separation 326 as the actuating beam 240 opens and closes the orifice 260. Having the greater volume of separation produced via spacing member 280 reduces such drag and therefore facilitates actuating beam 240 oscillating at faster frequencies.

With continued reference to FIG. 6, orifice plate 250 includes a base layer 252 and intermediate layer 254. For example, in one embodiment, base layer 252 comprises a silicon layer and intermediate layer 254 includes a silicon oxide layer. In the embodiment shown, a portion of the intermediate layer 254 proximate to orifice 260 is removed and a first portion of the valve seat 270 is disposed directly on base layer 252 and a second portion of the valve seat 270 is disposed on the intermediate layer 254. It should be understood that, in alternative embodiments, intermediate layer 254 extends all the way to boundaries of orifice 260 and valve seat 270 is disposed on intermediate layer 254. In still other embodiments, the removed portion of the intermediate layer 254 may have a cross-section equal to or greater than a cross-section of the valve seat 270 such that the valve seat 270 is disposed entirely on the base layer 252.

Due to the criticality of the spatial relationship between spacing member 280 and valve seat 270, attachment of spacing member 280 to orifice plate 250 may be performed in a manner allowing precise control over the resulting distance between actuating beam 240 and orifice plate 250. As shown, an adhesive layer 256 is used to attach spacing member 280 to orifice plate 250. In various embodiments, a precise amount of epoxy-based adhesive (e.g., SU-8, polymethylmethacrylate, silicone, etc.) is applied to intermediate layer 254 prior to placement of the combination of spacing member 280 and actuating beam 240 thereon. The adhesive is then cured to form an adhesive layer 256 having a precisely controlled thickness. For example, in some embodiments, a lower-most surface of spacing member 280 is substantially aligned with an upper surface of valve seat 270. Any desired relationship between such surfaces may be obtained to create a relationship between sealing member 290 and valve seat 270 that creates an adequate seal when actuating beam 240 is in the default position. In various embodiments, the adhesive layer 256 and the valve seat 270 may be formed from the same material (e.g., SU-8) in a single photolithographic process.

In various embodiments, once the actuating beam 240 and orifice plate 250 are attached to one another via adhesive layer 256 (e.g., to form micro-valve 230), an additional adhesive layer 248 is applied to the periphery of the actuating beam 240. The additional adhesive layer 248 is used to attach input fluid manifold 210 to actuating beam 240. The structural layer 222 (or the interposer 222b) may be positioned on the input fluid manifold 210 and coupled thereto via a second adhesive layer 225. In some embodiments, the additional adhesive layer 248 and the second adhesive layer 225 may include the same material as the adhesive layer 256.

In the example shown with respect to FIG. 6, the micro-valve 230 includes a sealing structure 500 including various components through which a seal is formed to separate the orifice 260 from a volume proximate the actuating beam 240. In the example shown, the sealing structure 500 includes the sealing member 290 and the valve seat 270. As described herein, the actuating beam 240 is configured such that an orifice-facing surface of the sealing member 290 contacts an upper surface of the valve seat 270 to form a seal at the interface between the valve seat 270 and the sealing member 290. The seal isolates the orifice 260 from the channel 212 such that minimal fluid escapes the jetting assembly 200 when no electrical signals are applied to the actuating beam 240. In other embodiments, the valve seat 270 may be excluded such that the orifice facing surface of the sealing structure 500 contacts the orifice plate 250 so as to fluidly seal the orifice 260.

Figure 7A:
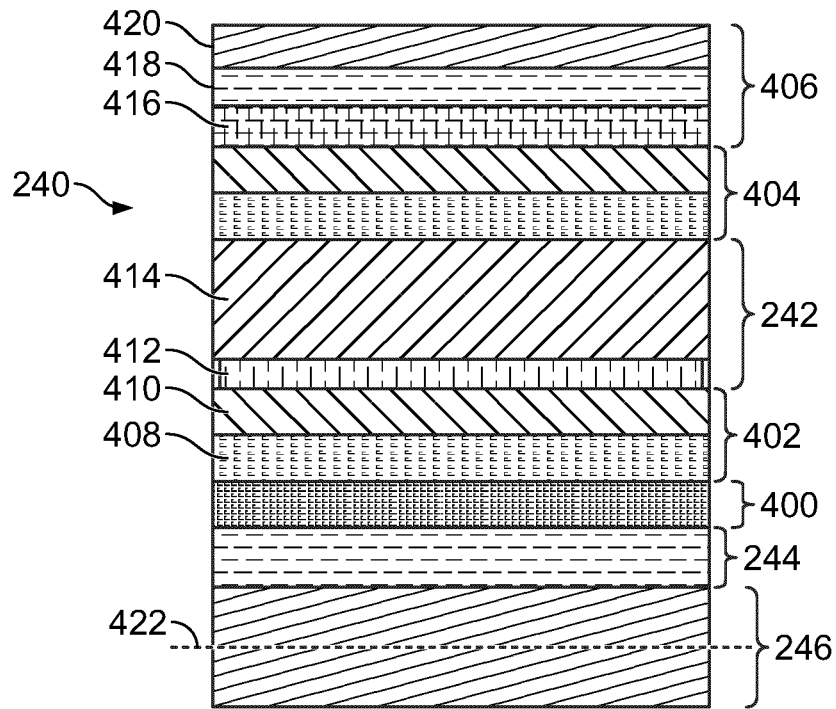
FIG. 7A is a cross-sectional view of an actuating beam of a micro-valve, according to an example embodiment.

Referring now to FIG. 7A, a more detailed view of actuating beam 240 is shown, according to an example embodiment and not to scale. As shown, actuating beam 240 includes the non-active layer 246, the tuning layer 244, a barrier layer 400, a first electrode portion 402, the actuating portion 242, a second electrode portion 404, and a passivation structure 406. As will be appreciated, actuating beam 240 may include more or fewer layers in various alternative embodiments.

In some embodiments, tuning layer 244 is disposed directly on non-active layer 246. Tuning layer 244 generally serves as an adhesion layer for facilitating deposition of the additional layers described herein. Additionally, as described herein, a thickness of tuning layer 244 may play a critical role in determining an overall curvature in actuating beam 240 when in its default position. Speaking generally, tuning layer 244 is configured to have a predetermined tuning stress such that in the closed position, the sealing member 290 of the actuating beam 240 contacts and exerts a force on the valve seat 270 so as to fluidly seal the orifice 260. In some embodiments, in the absence of an electrical signal, the predetermined tuning stress is configured to cause the actuating beam 240 to curve towards the orifice 260 such that in the absence of the valve seat 270, the sealing member surface of the sealing member 290 would be positioned a predetermined distance (e.g., 2 microns) beneath a lower surface of the spacing member 280. For example, the tuning layer 244 may be placed into a state of compressive stress as a result of the deposition of the additional layers described herein. As such, the thicker tuning layer 244 is, the greater curvature of actuating beam 240 towards orifice 260 when in its default position. In one example embodiment, the tuning layer 244 is constructed of silicon dioxide.

Barrier layer 400 acts as a barrier against diffusion of materials contained in the piezoelectric layer 414 to the tuning layer 244. If left unchecked, such migration will lead to harmful mixing effects between constituent materials in the layers, adversely impacting performance. In various embodiments, barrier layer 400 is constructed of, for example, zirconium dioxide. As shown, first electrode portion 402 includes an adhesion layer 408 and a first electrode 410. The adhesion layer 408 facilitates deposition of the first electrode 410 on barrier layer 400 and prevents diffusion of matter in the first electrode 410 to other layers. In various embodiments, adhesion layer 408 is constructed of titanium dioxide. First electrode 410 may be constructed of platinum, gold, rubidium, or any other suitable conductive material to provide a conductive pathway for electrical signals to be provided to actuating portion 242. In some embodiments, first electrode portion 402 is only included in select portions of actuating beam 240. For example, first electrode portion 402 may only be included proximate to and/or within the electrical connection portion 294.

Actuating portion 242 may be formed from a single or multiple layers of any suitable piezoelectric material. In the example shown, active portion includes a growth template layer 412 and a piezoelectric layer 414. Growth template layer 412 serves as a seed layer facilitating growth of the piezoelectric layer 414 having a desired texture (e.g., the {001} crystal structure and corresponding texture) to ensure maximal piezoelectric response. In some embodiments, growth template layer 412 is constructed of lead titanate. Piezoelectric layer 414 may be constructed of any suitable material such as lead zirconate titanate (PZT).

Piezoelectric layer 414 may be deposited using any method, such as, utilizing vacuum deposition or sol-gel deposition techniques. In some embodiments, piezoelectric layer 414 may have a thickness in a range of approximately 1-6 microns (e.g., 1, 2, 3, 4, 5, or 6 microns, inclusive) and is adapted to produce a deflection at an end of actuating beam 240 of approximately 10 microns when an electrical signal is applied thereto. A deflection of 10 microns (e.g., such that a surface of sealing member 290 departs from valve seat 270 by slightly less than that amount) may be sufficient to produce droplets at orifice 260 having a desired size. In some embodiments, piezoelectric layer 414 has a piezoelectric transverse coefficient (d31 value) magnitude of approximately 140 to 160 pm/V. This value may enable adequate deflection of actuating beam 240 to be generated via electrical signals supplied to first and second electrode portions 402 and 404.

As shown, second electrode portion 404 is disposed on actuating portion 242. In various embodiments, second electrode portion 404 is structured similarly to first electrode portion 402 described herein. Application of a voltage to the first electrode portion 402 and/or second electrode portion 404 thus induces a strain in piezoelectric layer 414, causing the cantilevered portion 308 to bend away from the orifice plate 250. Through application of periodic control signals to first and second electrode portions 402 and 404, periodic cycling of actuating beam 240 generates droplets output from orifice 260 at a desired frequency. While FIG. 7A shows the first and second electrode portions 402 and 404 overlapping each other, in other locations, the first and second electrode portions 402 and 404 may not overlap. This may limit or prevent electron leakage between the first and second electrode portions 402 and 404 which can damage the piezoelectric layer 414 or cause electrical shorts.

In various embodiments, the electrodes contained in first and second electrode portions 402 and 404 are deposited in a non-annealed state. As a result, the electrodes are deposited in a substantially compressive state, which impacts the overall curvature of actuating beam 240 when in a default position. The mode of deposition of piezoelectric layer 414 may impact the compressive state of the electrodes. For example, in some circumstances, where the piezoelectric layer 414 is deposited (e.g., via a vapor deposition technique) and later cured at a predetermined temperature (e.g., approximately 700 degrees C.), the curing may cause the electrode 410 to anneal and become removed from the compressive state. Such a removal impacts the overall balancing of stresses in actuating beam 240, which changes its default curvature. Accordingly, it may be beneficial to use a low-temperature deposition process for piezoelectric layer 414 (e.g., a low-temperature sol-gel deposition process or plasma-enhanced chemical vapor deposition process) to prevent the reversal of stresses in the electrodes. In various embodiments, second electrode portion 404 may be annealed at a higher temperature than the first electrode portion 402, for example, to create a predetermined tuning stress in the tuning layer 244.

The materials shown in FIG. 7A may extend substantially entirely through the length of actuating beam 240. As such, there is an overlap between electrode portions 402 and 404 and the reservoir formed via micro-valve 230. In various embodiments, the fluid contained in the reservoir is electrically conductive and/or corrosive to the materials forming the first and second electrode portions 402 and 404. Thus, it is preferable to isolate electrode portions 402 and 404 from the reservoir to prevent the fluid contained in the reservoir from contacting electrode portions 402 and 404.

In this regard, the passivation structure 406 is configured to perform such isolation. In the example shown, passivation structure 406 includes a dielectric layer 416, an insulator layer 418, and a barrier layer 420. Barrier layer 420 may be constructed of silicon nitride, which acts as a diffusion barrier against water molecules and ions contained in the fluid to prevent corrosion of electrode portions 402 and 404. In some embodiments, insulator layer 418 includes a silicon dioxide layer having a compressive stress that roughly counterbalances the tensile stress in the barrier layer 420. Dielectric layer 416 may be constructed of aluminum oxide to prevent oxidation of the additional layers contained in actuating beam 240. In some embodiments, an additional metal layer is disposed on barrier layer 420. For example, the metal layer may be constructed of Talinum oxide or any other suitable, chemically-resistant metal to further enhanced the protective properties of passivation structure 406. In particular embodiments, the barrier layer 420 may be formed from Teflon or parylene. In other embodiments, at least a portion of the actuating beam 240, i.e., the structure formed by the layers shown in FIG. 7A may be covered or over coated by a Teflon or parylene layer. Such an overcoat may prevent micro-cracks from forming in the layers of the actuating beam 240. In still other embodiments, the over coat may include a metallic layer, for example, a tantalum or palladium layer.

The addition of passivation structure 406 may significantly impact the default positioning of actuating beam 240. This is so because passivation structure 406 is offset from a neutral axis 422 of compression of the actuating beam 240. As shown, the neutral axis 422 is within the non-active layer 246, which means that the electrode portion 404 and passivation structure 406 are the most distant therefrom in actuating beam 240. Given this, the tensile or compressive stresses induced in such layers will greatly influence the default curvature of actuating beam 240. As such, the thickness of tuning layer 244 is selected based on the structure of various constituent layers of passivation structure 406.

Figure 7B:
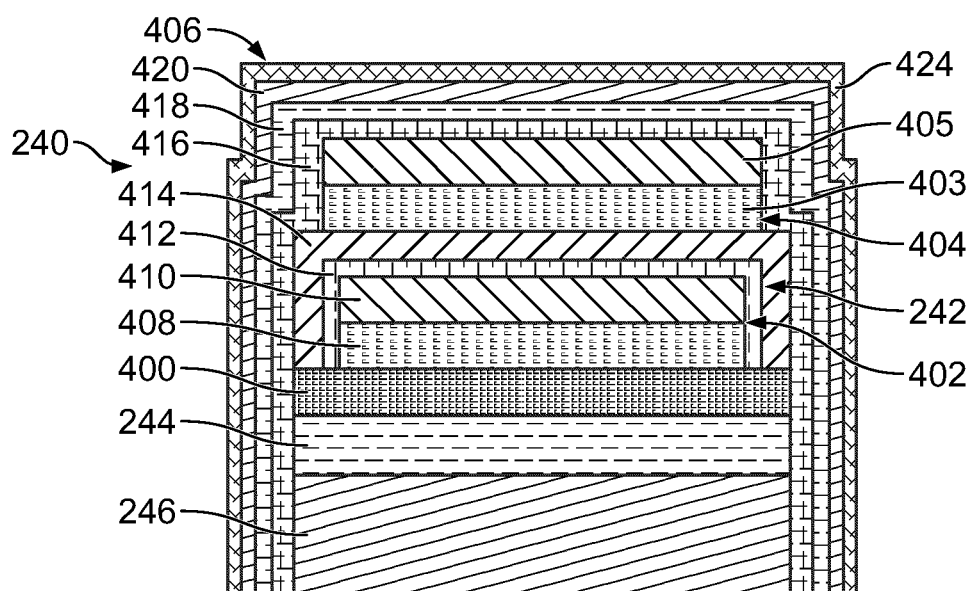
FIG. 7B is a front cross-sectional view of the actuating beam of FIG. 7A, according to another example embodiment.

FIG. 7B is front cross-sectional view of the actuating beam 240 showing an arrangement of each of the layers included in the actuating beam 240, according to an example embodiment and not to scale. As shown, actuating beam 240 includes the non-active layer 246, the tuning layer 244 and a barrier layer 400, as described with respect to FIG. 7A. The first electrode portion 402 includes the adhesion layer 408 (e.g., titanium dioxide) positioned on the barrier layer 400, and a conductive layer or electrode 410 (e.g., platinum, gold, rubidium, etc.) positioned thereon. The first electrode portion 402 is configured to have a width which is less than a width of the barrier layer 400 such that ends of the electrode portion 402 in a direction perpendicular to a longitudinal axis of the actuating beam 240 are located inwards of the ends of the barrier layer 400 in the same direction.

The actuating portion 242 including the seed layer 412 and the piezoelectric layer 414 is conformally disposed on the first electrode portion 402 so as to extend beyond the lateral ends of the first electrode portion 402 and contact the barrier layer 400. In this manner the piezoelectric layer completely surrounds or encapsulates at least the portion of the first electrode portion 402 which overlaps or is proximate to the second electrode portion 404. The second electrode portion 404 includes an adhesion layer 403 (e.g., titanium) and a conductive layer 405 (e.g., platinum, gold, rubidium, etc.). In some embodiments, the second electrode portion 404 may include only the conductive layer 405 disposed directly on the piezoelectric layer 414 (i.e., the adhesion layer 403 is omitted). Since the actuating portion 242 overlaps and extends beyond the ends of the first electrode portion 402, the actuating portion effectively electrically isolates the first electrode portion 402 from the second electrode portion 404, so as to prevent electron leakage and current migration which may be detrimental to the performance of the actuating beam 240.

The passivation structure 406 conformally coats exposed portions of each of the other layers 246, 244, 400, 402, 242 and 404. However, a bottom surface of the non-active layer 246 may not be coated with the passivation structure 406. The passivation structure 406 may include a dielectric layer 416, an insulator layer 418, a barrier layer 420, and a top passivation layer 424. Barrier layer 420 may be constructed of silicon nitride, which acts as a diffusion barrier against water molecules and ions contained in the fluid to prevent corrosion of electrode portions 402 and 404. Silicon nitride, however, is generally in a state of tensile stress once deposited on the remaining layer. Insulator layer 418 is configured to counterbalance such tensile stress. For example, in some embodiments, insulator layer 418 includes a silicon dioxide layer having a compressive stress that roughly counterbalances the tensile stress in barrier layer 420. In various embodiments, the barrier layer 420 may be positioned beneath the insulator layer 418. Dielectric layer 416 may be constructed of aluminum oxide, titanium oxide, zirconium oxide or zinc oxide to prevent oxidation of the additional layers contained in actuating beam 240. Thus, passivation structure 406 serves to prevent both corrosion and oxidation—two major sources of defects caused by the presence of fluids—in actuating beam 240, and thus ensures long-term performance of micro-valve 230. Furthermore, the top passivation layer 424 is disposed on the barrier layer 420 and may include a Teflon or parylene layer. Such an overcoat may prevent micro-cracks from forming in the layers of the actuating beam 240, and may also prevent the underlying layer from a plasma discharge (e.g., which the buried layers may be exposed to in subsequent fabrication operations). In particular embodiments, the top passivation layer 424 may include a metallic layer, for example, a tantalum or palladium layer. In some embodiments, an additional metal layer is disposed on barrier layer 420. For example, the metal layer may be constructed of Talinum oxide or any other suitable, chemically-resistant metal to further enhanced the protective properties of passivation structure 406.

Figure 8:
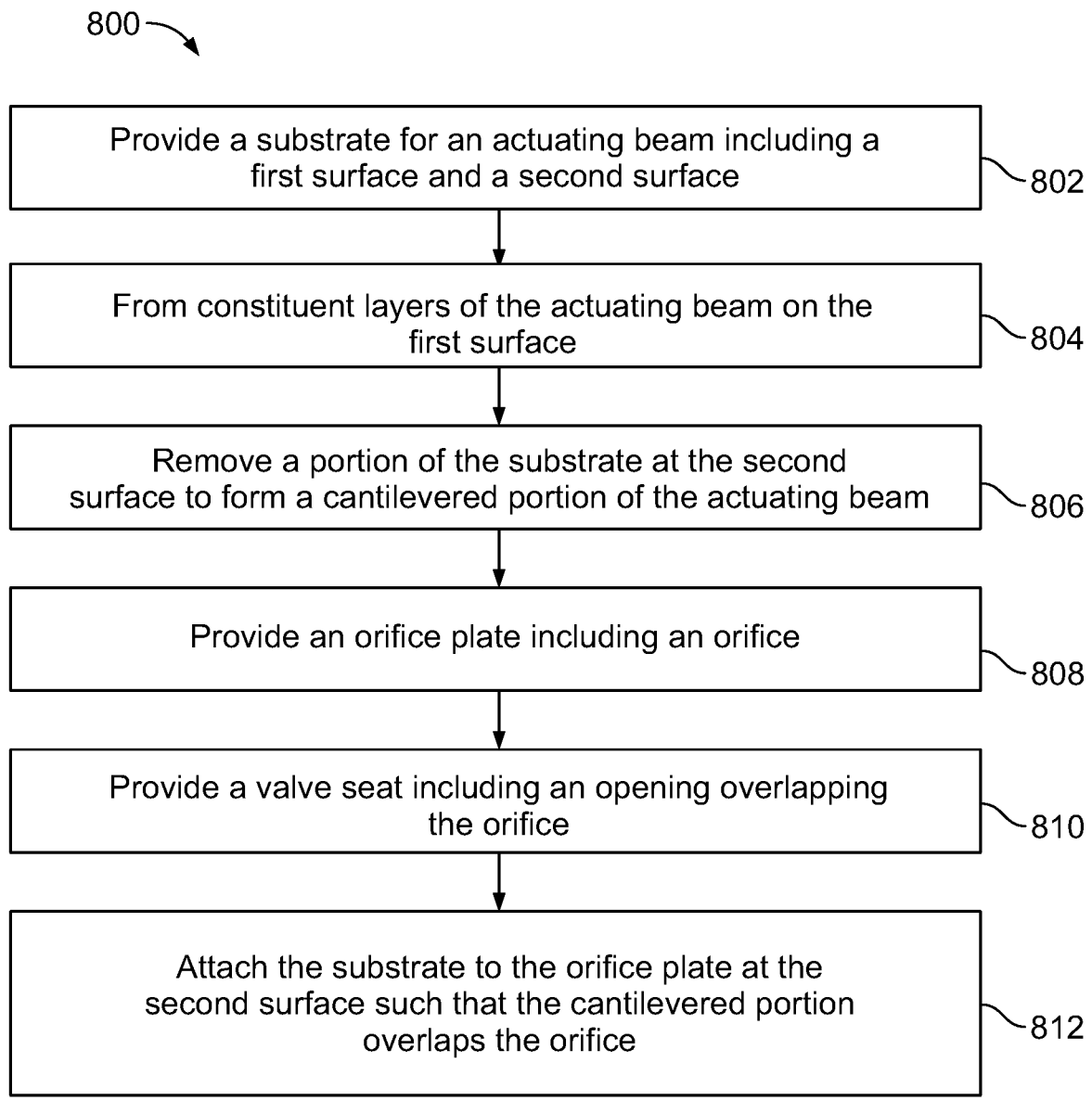
FIG. 8 is a flow diagram of a method of constructing a micro-valve, according to an example embodiment.

Referring now to FIG. 8, a flow diagram of a method 800 of constructing a micro-valve is shown, according to an example embodiment. Method 800 may be performed to construct a micro-valve as described herein with respect to FIG. 1-7B. As such, method 800 may be performed to construct one or more micro-valves, each including an actuating beam having at least one layer of piezoelectric material. Like the micro-valve 230, 230b described with respect to FIGS. 5A-5B, the actuating beam of any constructed micro-valves may include an electrical connection portion, a base portion, and a cantilevered portion. Various operations contained within method 800 are described with reference to FIGS. 9-15 to aid the description of method 800.

In an operation 802, a substrate for an actuating beam is provided. FIG. 9 shows an example of such a substrate 900. Substrate 900 includes a first surface 902 and a second surface 904. In the example shown, substrate 900 is a double SOI wafer including a first silicon layer 906 and a second silicon layer 908. First and second silicon layers 906 and 908 may have predetermined thicknesses 916 and 918 based on the desired design. In the example shown, thicknesses 916 and 918 are equivalent or substantially equivalent. In such an embodiment, the thicknesses 916 and 918 are selected based on a desired rigidity and/or flexibility of the resulting actuating beam. As described herein, the default position of the actuating beam is determined based on the combination of stresses of constituent layers of the actuating beam. As such, the values of thicknesses 916 and 918 contribute to the beam's default position. Accordingly, the thicknesses 916 and 918 may be selected based on desired construction of additional layers of the actuating beam.

As shown, the first silicon layer 906 is disposed between a first silicon dioxide layer 910 and a second silicon dioxide layer 912. The second silicon layer 908 is disposed between the second silicon dioxide layer 912 and a third silicon dioxide layer 914. Substrate 900 may take on alternative forms in various alternative embodiments. For example, in one embodiment, substrate 900 includes a silicon panel including the first and second surfaces 902 and 904. The SOI wafer may initially comprise a base layer (e.g., a base silicon layer) located below the third silicon dioxide layer 914, which may be removed.

In an operation 804, constituent layers of the actuating beam are formed on the first surface of the substrate 900. FIG. 10 shows the substrate 900 after deposition of constituent layers 1000. In various embodiments, constituent layers 1000 may include any combination of the layers described with respect to FIGS. 7A-B. In some embodiments, constituent layers 1000 include the barrier layer 400, first electrode portion 402, growth template layer 412, piezoelectric layer 414, second electrode portion 404 and the passivation structure 406 described with respect to FIGS. 7A-B.

Constituent layers 1000 may be deposited on the first surface 902 via any suitable technique. For example, barrier layer 400 may be deposited using a sputtering process and cooled. Upon cooling of barrier layer 400, adhesion layer 408 of first electrode portion 402 may be deposited on barrier layer 400. Adhesion layer 408 may be a titanium dioxide layer deposited using sputtering, ion beam deposition, electron beam deposition, thermal deposition, atomic layer deposition, or any suitable technique. Upon completion of adhesion layer 408, the first electrode 410 is deposited on adhesion layer 408. First electrode 410 may include a platinum layer deposited via atomic layer deposition, sputtering, ion beam deposition, electron beam deposition, thermal deposition, or any other suitable technique.

A layer of piezoelectric material is then deposited on first electrode 410. As shown, growth template layer 412 is deposited on the first electrode 410 to facilitate the piezoelectric layer 414 having a desired texture. Growth template layer 412 may be constructed of lead titanate and deposited using sputtering or any other suitable technique. Upon deposition of growth template layer 412, piezoelectric layer 414 is deposited thereon. Piezoelectric layer 414 may be deposited using any method, such as, utilizing vacuum deposition or sol-gel deposition techniques, and may include a PZT. In some embodiments, piezoelectric layer 414 has a thickness of approximately 100 microns and is adapted to produce a deflection at an end of actuating beam 240 of approximately 10 microns when an electrical signal is applied thereto. A deflection of 10 microns (e.g., such that a surface of sealing member 290 departs from valve seat 270 by slightly less than that amount) may be sufficient to produce droplets at orifice 260 having a desired size. In some embodiments, piezoelectric layer 414 has a piezoelectric transverse coefficient (d31 value) magnitude of approximately 140 to 160 pm/V. This value may enable adequate deflection of actuating beam 240 to be generated via electrical signals supplied to first and second electrode portions 402 and 404. As described with respect to FIG. 7A-B, it may be beneficial to use a low-temperature deposition process for piezoelectric layer 414 (e.g., a low-temperature sol-gel deposition process or plasma-enhanced chemical vapor deposition process) so as to minimize structural impacts on the first electrode 410. The second electrode portion 404 may then be deposited on the piezoelectric layer 414 in a manner similar to the first electrode portion 402. Passivation structure 406 may then be deposited on the second electrode portion 404 using any suitable combination of techniques.

In certain embodiments, certain ones of the constituent layers 1000 only extend partially through the actuating beam. In other words, certain ones of the constituent layers 1000 may only be disposed on portions of the first surface 902. For example, first electrode portion 402 may only be disposed within an electrical connection portion (such as the electrical connection portion 294, 294b described with respect to FIGS. 5A-B) of the actuating beam. Accordingly, deposition of first electrode portion 402 may be limited to an electrode region 1002. The relative positioning of electrode region 1002 with respect to an end 1004 of the substrate may be selected based on the dimensioning of other components of the resulting micro-valve or incorporating jetting assembly. For example, in some embodiments, electrode region 1002 is separated from the end 1004 by a distance 1008 chosen based on a desired length of a cantilevered portion of the actuating beam and/or a desired spacing of openings contained in an input fluid manifold to be coupled to the actuating beam during assembly of an incorporating jetting assembly. The combination of the substrate 900 and constituent layers 1000 is a substantially planar sheet.

In an operation 806, a portion of the substrate 900 is removed to form a cantilevered portion of the actuating beam. FIG. 11 shows substrate 900 after multiple modifications have been performed on the combination of the substrate 900 and constituent layers 1000. As shown, an opening 1100 extends from the first surface 902 to the second surface 904. Opening 1100 divides the substrate 900 into an actuating beam portion 1102 and a structural portion 1104. Actuating beam portion 1102 generally includes the actuating beam of the micro-valve as described herein. Generally, the opening 1100 (together with an input fluid manifold of the incorporating jetting assembly) forms part of a fluid reservoir for holding pressurized fluid dispensed via the micro-valve. Opening 1100 may be substantially cylindrical-shaped and have a diameter 1106 selected based on a desired length of the cantilevered portion of the actuating beam.

Structural portion 1104 may be attached to the input fluid manifold, as described herein. For example, structural portion 1104 may contact a structure (e.g., an arm similar to the third arm 334 described above with respect to FIG. 5A) of the input manifold such that the opening 1100 the structural portion 1104 encloses a volume with input fluid manifold to form the reservoir. The opening 1100 may be formed via an etching operation. For example, a first etching mask may be applied to the second surface 904. The first etching mask may include an opening (or series of openings when a plurality of micro-valves are being formed) shaped to form an actuating beam portion 1102 having a desired shape. An example embodiment of the actuating beam portion 1102 is described with respect to FIG. 12. After application of the first etch mask, an etchant is applied to the substrate 900 to form opening 1100.

After formation of the opening 1100, additional operations may be performed on the actuating beam portion 1102. For example, as shown in FIG. 11, a cavity 1108 is formed in actuating beam portion 1102. Cavity 1108 extends only through the second silicon layer 908 and the second and third silicon dioxide layers 912 and 914 in the depicted embodiment. Cavity 1108 may be formed using a second etching process. For example, after performance of the initial etch to form the opening 1100, a second etching mask may be disposed at the second surface 904. The second etching mask may have openings corresponding in shape to cavity 1108. An etchant may then be applied at the second surface 904 to remove a portion of the substrate 900 and form the cavity 1108. Beneficially, the second and third silicon dioxide layers 912 and 914 may retard the etchant such that the etch may be stopped when a desired amount of material has been removed. As such, the entirety of the first silicon layer 906 and first silicon dioxide layer 910 may remain after performance of the second etch to form an actuating beam 1110. First silicon layer 906 may form a non-active portion (e.g., similar to the non-active portion 246 described with respect to FIGS. 6 and 7A-B) of the actuating beam and first silicon dioxide layer 910 may form a tuning layer (e.g., similar to the tuning layer 244 described with respect to FIGS. 6 and 7A-B) of the actuating beam.

As shown in FIG. 11, formation of the cavity 1108 creates a spacing member 1112 and a sealing member 1114 out of the remaining portions of the layers 908, 912, and 914 after the second etch. The actuating beam 1110 is shown to include a base portion 1116 and a cantilevered portion 1118. Base portion 1116 is co-extensive with the spacing member 1112 and the cantilevered portion 1118 is cantilevered above cavity 1108. As shown, a distance 1120 separates the spacing member 1112 from the sealing member 1114. The distance 1120 is determined based on desired dimensions of the sealing member 1114, which is determined based at least in part on the size of the opening 1100 and the substrate 900.

FIG. 12 shows a cross-sectional view of actuating beam 1110, according to an example embodiment. As shown, the base portion 1116 is substantially rectangular-shaped. The cantilevered portion 1118 includes a trapezoidal portion 1204 and an overlapping portion 1206 that is substantially cylindrical-shaped. The trapezoidal portion 1204 may improve operation of actuating beam 1110 over a rectangular-shaped design by eliminating fluid resistance. As described herein, upon attachment of the substrate 900 to the jetting assembly, actuating beam 1110 may be positioned such that the overlapping portion 1206 overlaps an orifice in an orifice plate. Sealing member 1114 may extend from the overlapping portion 1206 towards the orifice. Constituent layers 1000 may be constructed such that, in a default position of actuating beam 1110, sealing member 1114 contacts a valve seat to close the orifice.

The actuating beam 1110 may be provided with the depicted shape via the first etch during which the opening 1100 is formed. For example, the first etch mask may cover an area on substrate 900 that corresponds to the depicted shape. During the etch, portions of the substrate underlying a non-covered area may be removed to form an actuating beam portion 1102 having a shape that corresponds to the shape of the actuating beam 1110 depicted in FIG. 12.

In an operation 808, an orifice plate including an orifice is provided. FIG. 13 depicts an exemplary orifice plate 1300. In the example shown, orifice plate 1300 is a SOI wafer. Orifice plate 1300 includes an orifice 1302 extending therethrough. The orifice 1302 may be formed through etching or any other suitable technique. In various embodiments, orifice 1302 is sized based on a desired output droplet volume of the micro-valve. For example, orifice 1302 may have a diameter of approximately 60 microns. The orifice plate 1300 may share the same dimensions as substrate 900 (e.g., prior to any operations being performed thereon). In an operation 810, a valve seat is disposed on the orifice plate 1300. As shown in FIG. 14, a valve seat 1400 may be disposed on an upper surface of the orifice plate 1300. Valve seat 1400 may surround the orifice 1302. For example, valve seat 1400 may be substantially annular-shaped, and defining an opening 1402 aligned with the orifice 1302. Valve seat 1400 may be formed of a photoresist material deposited via spin coating (e.g., SU-8).

In an operation 812, the substrate 900 is attached to the orifice plate 1300 at the second surface 904 such that the cantilevered portion 1118 overlaps the orifice 1302. As shown, the spacing member 1112 is attached to orifice plate 1300 via a first section of adhesive 1502. The structural portion 1104 is attached to orifice plate 1300 via a second section of adhesive 1504. For example, first and second sections of adhesive 1502 and 1504 may initially be deposited on the second surface 904 (e.g., via spin coating or any other suitable method). After deposition of the adhesive, the orifice plate 1300 may be aligned with the substrate 900 (e.g., such that outer surfaces thereof are aligned) and the substrate 900 and orifice plate 1300 may be pressed together. Final curing steps for the sections of adhesive 1502 and 1504 may then be performed to attach the orifice plate 1300 to the substrate 900.

As shown, the dimensioning of the various features described herein is performed such that, upon the attachment of the substrate 900 to the orifice plate 1300, the overlapping portion 1208 is aligned with the orifice 1302. As a result, the sealing member 1114 substantially covers the orifice 1302 and contacts the valve seat 1400 when the actuating beam 1110 is in its default position. Thus, the unique ordering of construction steps described herein facilitates the formation of an actuating beam 1110 having all of the performance benefits described herein.

Figure 16:
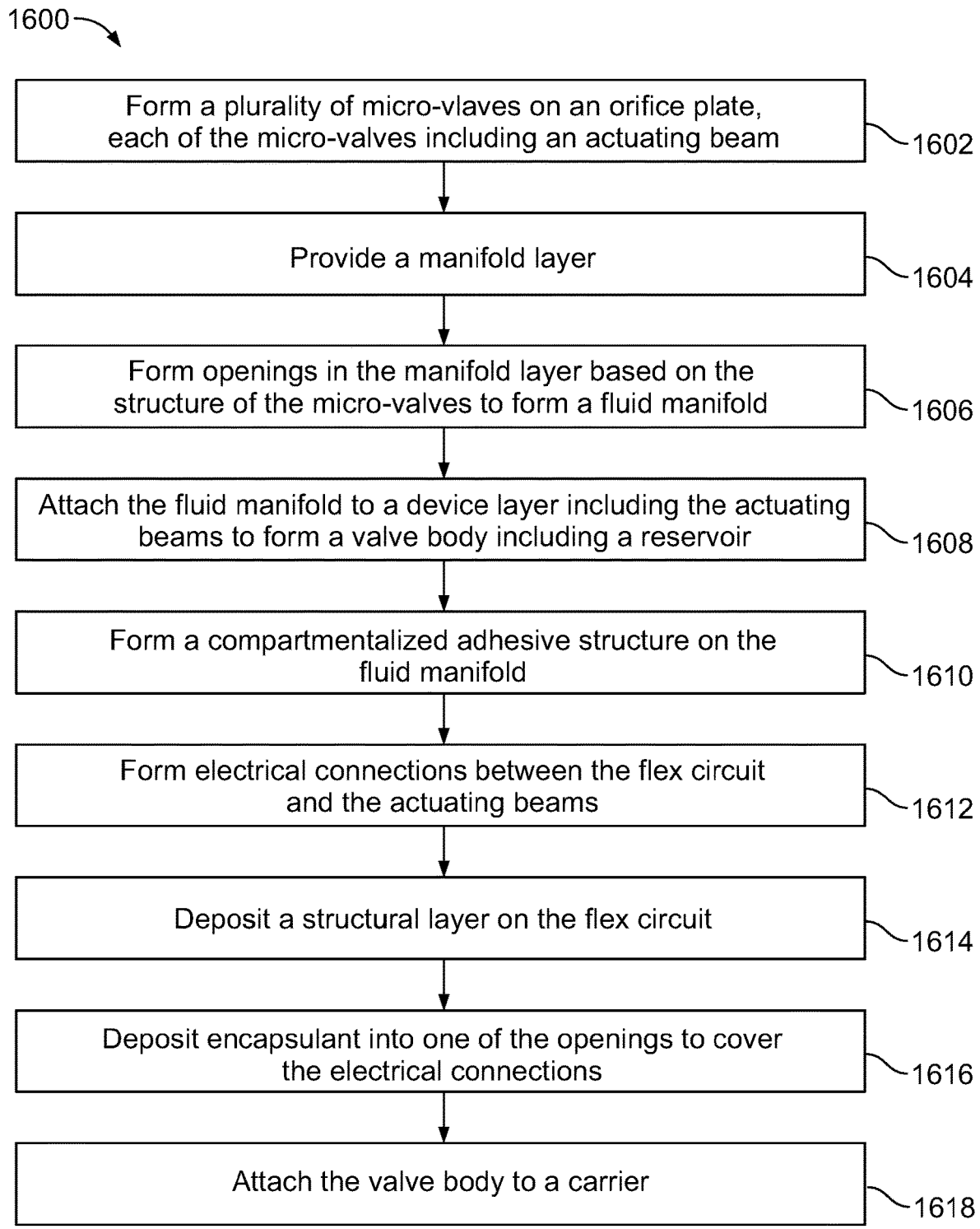
FIG. 16 is a flow diagram of a method of constructing a jetting assembly, according to an example embodiment.

Referring now to FIG. 16, a flow diagram of a method 1600 of constructing a jetting assembly is shown, according to an example embodiment. Method 1600 may be performed, for example, to construct the jetting assembly 200, 200b described with respect to FIGS. 5A-B. The description of the method 1600 is aided through referral to FIGS. 17-23.

In an operation 1602, a plurality of micro-valves are formed on an orifice plate. In various embodiments, the operation 1602 substantially comprises performance of the method 800 described with respect to FIG. 8. The method 800 may be performed to form a plurality of micro-valves within a single substrate. For example, the substrate may be etched to form a plurality of actuating beams, with each of the actuating beams including a cantilevered portion. In one embodiment, the actuating beams may form a linear arrangement of actuating beams. The actuating beams may be aligned in a parallel or anti-parallel manner. In the parallel arrangement, each of the cantilevered portions of the actuating beams extend into an opening (e.g., the opening 1100) from the same direction. In the anti-parallel arrangement, each actuating beam extends in a direction opposite to the others immediately adjacent to it. In other words, a first base section is disposed on one side of an opening in the substrate and a second base section of an adjacent actuating beam is disposed on another side of the opening, and so on. As such, the actuating beams are inter-digitated with respect to one another. Such an arrangement is beneficial in that it potentially enables micro-valves to be placed closer together, thus allowing more micro-valves to be placed in the jetting assembly.

In one embodiment, the plurality of micro-valves includes 52 micro-valves in the parallel arrangement. In such an embodiment, the orifice plate includes 52 orifices (one for each micro-valve) that are also linearly arranged. It should be noted that alternative arrangements of micro-valves may be formed by varying the manner in which the substrate and orifice plate are etched. Any suitable pattern of micro-valves may be formed via the method 800 described herein.

Figure 17:
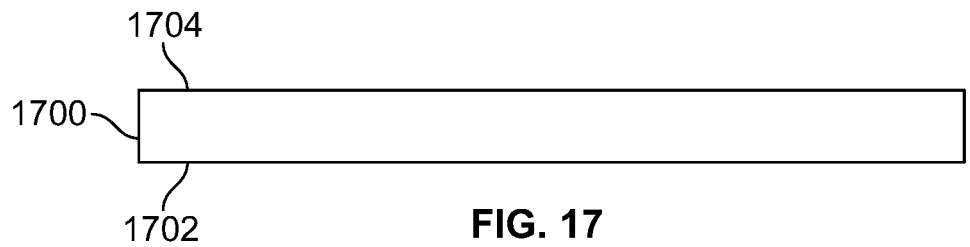
FIGS. 17, 18, 19, 20, 21, 22, 23, 24, 25 are views of elements of a jetting assembly at various points of the method described with respect to FIG. 16, according to an example embodiment.
Figure 18:
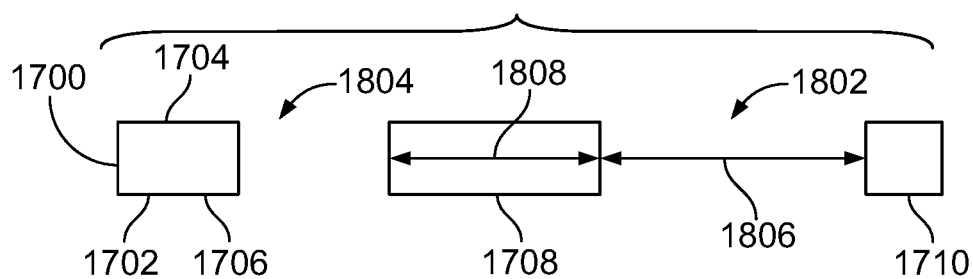

In an operation 1604, a manifold layer is provided. FIG. 17 shows an example manifold layer 1700. In some embodiments, the manifold layer 1700 is constructed of glass. In another embodiment, manifold layer 1700 is constructed of silicon. Manifold layer 1700 is shown to be substantially planar and include a first surface 1702 and a second surface 1704. In an operation 1606, openings are formed in the manifold layer based on the structure of the micro-valves. For example, as shown in FIG. 18, a first opening 1802 and a second opening 1804 are formed in the manifold layer 1700. Openings 1802 and 1804 may be formed by sandblasting or any other suitable technique. The openings 1802 and 1804 separate the manifold layer 1700 into a first arm 1706, second arm 1708, and third arm 1710. In some embodiments, manifold layer 1700 has a width corresponding to the substrate out of which the plurality of micro-valves are constructed.

The openings 1802 and 1804 are substantially rectangular-shaped and have dimensions based on the plurality of micro-valves. For example, the first opening 1802 is shown to have a width such that the second arm 1708 and the third arm 1710 are separated by a distance 1806. The distance 1806 may be selected based on features of the plurality of micro-valves. In various embodiments, the distance 1806 is at least the distance between the structural portion 1104 and the spacing member 1112 of the actuating beams of the micro-valves. The second opening 1804 is shown to be separated from the first opening 1802 such that the second arm 1708 has a width 1808. In some embodiments, the width 1808 is at most equal to a width of the base portion of the actuating beams. Such an arrangement necessitates overlap between the cantilevered portion of the actuating beam and the opening 1100. This provides the cantilevered portion with clearance for moving in response to application of an electrical charge thereto. Additionally, the second opening 1804 may be formed such that it overlaps with electrical connection portions contained in the plurality of micro-valves. Manifold layer 1700 will be also be described as an input fluid manifold 1700 herein.

Figure 19:
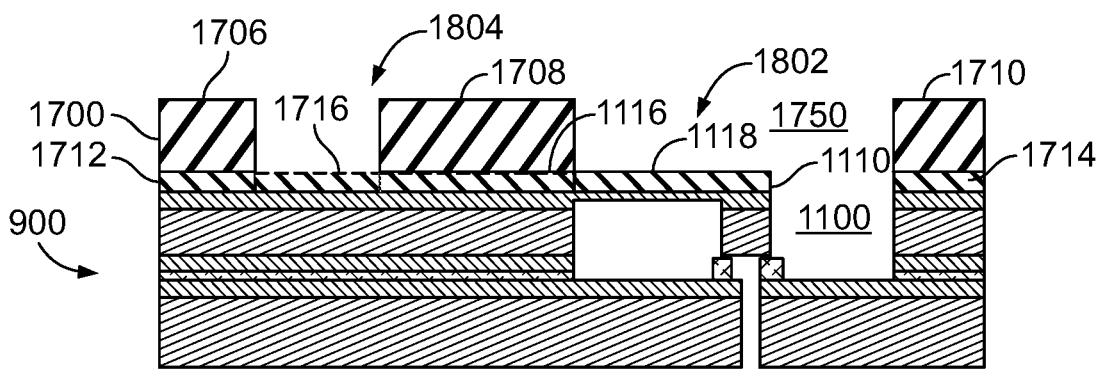

In an operation 1608, the input fluid manifold 1700 is attached to the actuating beams to form a valve body including a reservoir. As shown in FIG. 19, the input fluid manifold 1700 is disposed on an upper surface of the actuating beam 1110 (and any additional actuating beams aligned with the actuating beam 1110). In the depicted embodiment, when the input fluid manifold 1700 is aligned with the actuating beam 1110 (e.g., such that outer edges of the substrate 900 and input fluid manifold 1700 are aligned with one another), the cantilevered portion 1118 is aligned with the first opening 1802. The second arm 1708 substantially overlaps the base portion 1116 of actuating beam 1110. Additionally, the first and third arms 1706 and 1710 overlap end portions 1712 and 1714 of actuating beam 1110. Input fluid manifold 1700 may be secured to the actuating beam 1110 via an adhesive layer disposed in regions of overlap between the actuating beam and the input fluid manifold 1700.

First opening 1802 defines a reservoir 1750 in conjunction with the opening 1100 in the substrate 900. The second opening 1804 overlaps an electrical connection portion 1716 of the actuating beam 1110. Electrical connection portion 1716 generally contains the electrode region 1002 described with respect to FIG. 10. In the electrical connection portion 1716, an electrode contained within actuating beam 1110 may be exposed to provide an electrical connection point. As described herein, the second opening 1804 provides a place to form an electrical connection between the actuating beam 1110 and an external circuit board.

Figure 20:
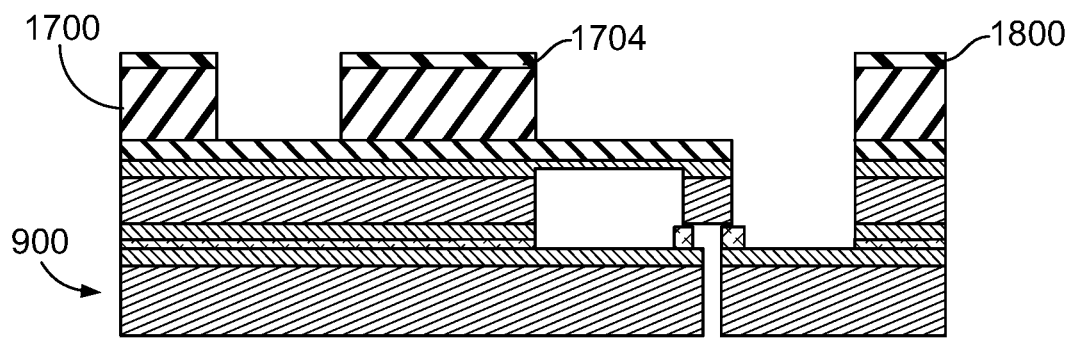

In an operation 1610, a compartmentalized adhesive structure is formed on the input fluid manifold 1700. As shown in FIG. 20, compartmentalized adhesive structure 1800 may be formed on the first surface 1704 of the input fluid manifold 1700 and attached to the device layer. In various embodiments, the compartmentalized adhesive structure 1800 is formed of a negative photoresist material such as SU-8. For example, a layer of photoresist may be disposed on the second surface 1704, pre-baked, and a photomask applied thereto. The photomask may be patterned based on a desired pattern for the compartmentalized adhesive structure 1800. The photoresist may then be exposed to ultraviolet radiation to produce the compartmentalized adhesive structure 1800.

Figure 21:
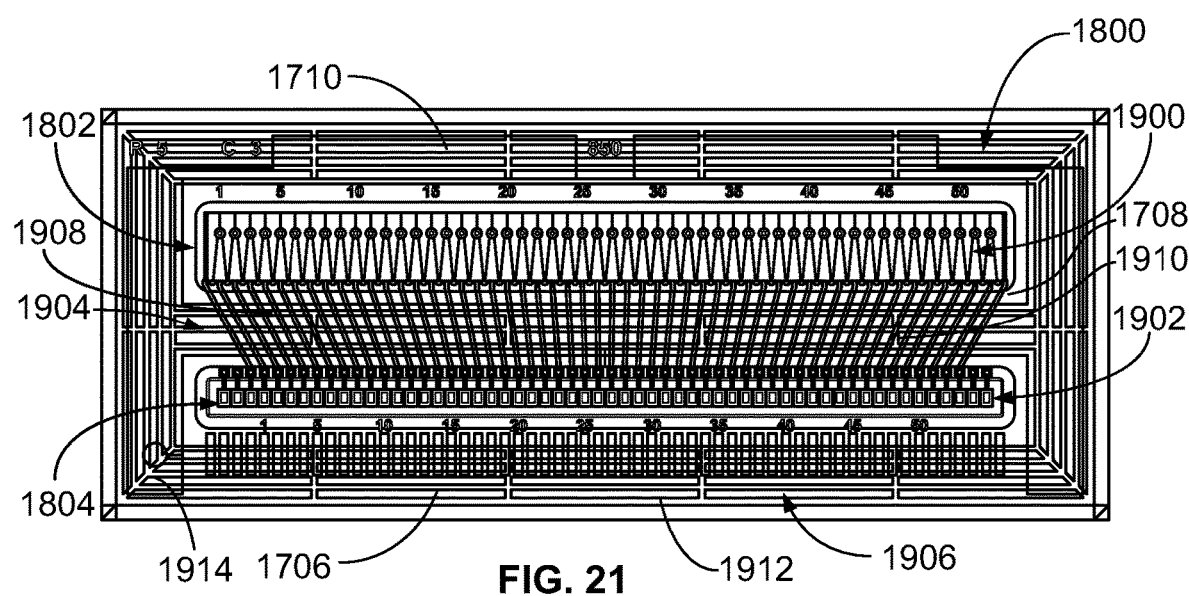

FIG. 21 shows a plan view of the jetting assembly at this stage of production, and an example pattern for the compartmentalized adhesive structure 1800. As shown, a plurality of cantilevered portions 1900 of corresponding micro-valves overlap with the first opening 1802. Additionally, a plurality of electrical connection portions 1902 of corresponding micro-valves overlap the second opening 1804.

Compartmentalized adhesive structure 1800 includes a central portion 1904 located in a central portion of the first surface of the fluid input manifold and a peripheral portion 1906 located in a peripheral portion of the first surface of the fluid input manifold. As shown, the central portion 1904 is disposed on the second arm 1708 between the first and second openings 1802 and 1804. Central portion 1904 includes a plurality of linear segments 1908 of adhesive material. The linear segments 1908 extend substantially parallel to first and second openings 1802 and 1804. Gaps are disposed between the linear segments 1908 to form compartments. The linear segments 1908 are separated by compartment boundaries 1910. In the example shown, compartment boundaries 1910 are constructed of adhesive material and extend substantially perpendicular to the first and second openings 1802 and 1804. Beneficially, central portion 1904 separates areas of potential leakage from one another. For example, if there is a poor seal at a particular location of the valve body (e.g., between the input fluid manifold 1700 and the structural layer 2200 described herein) fluid contained in the reservoir 1750 may seep into second opening 1804. Since the second opening 1804 may contain electrical connections, such a leak may significantly degrade performance of the jetting assembly, or render it inoperable.

The compartments formed by the central portion 1904 provide a volume for such leaking fluid. This prevents the leaking fluid from reaching the second opening 1804. Additionally, the compartments prevent the leaking fluid from reaching other points of contact between the input fluid manifold 1700 and the structural layer to ensure maintenance of an adequate seal.

As shown, the peripheral portion 1906 comprises a plurality of concentric loops 1912 of adhesive material. The concentric loops 1912 generally follow the outer circumferential shape of input fluid manifold 1700. Concentric loops 1912 are separated by gaps that form compartments for leaking fluid. Compartment boundaries 1914 are disposed at corners of the input fluid manifold 1700 and along the periphery to isolate points of imperfections in the seal from one another to prevent the accumulation of leaking fluid.

Figure 22:
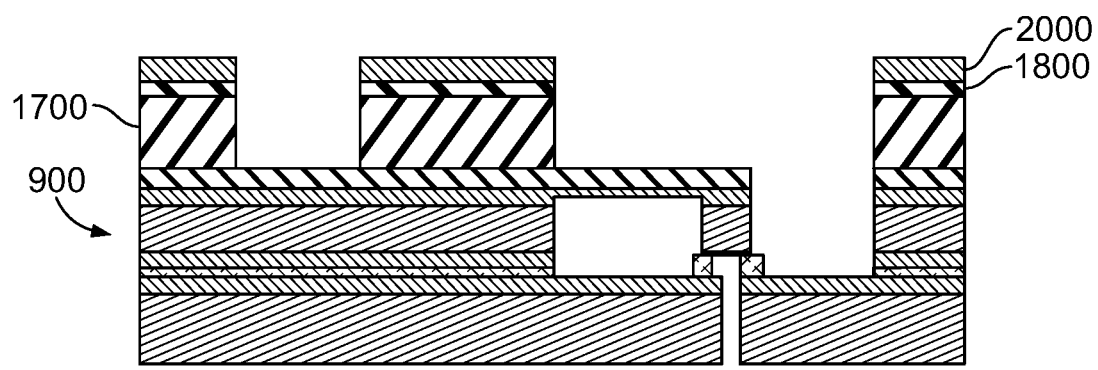

In an operation 1612, a flex circuit is attached to the fluid manifold via the compartmentalized adhesive structure 1800. As shown in FIG. 22 the flex circuit 2000 is disposed on the compartmentalized adhesive structure 1800. Flex circuit 2000 includes openings shaped to correspond to first and second openings 1802 and 1804 in input fluid manifold 1700. Flex circuit 2000 includes a plurality of conductive pathways through which individual ones of the actuating beams may be connected to control signal sources to facilitate oscillation of the actuating beams. After flex circuit 2000 is aligned and disposed on compartmentalized adhesive structure 1800, the adhesive may be hardened via a final baking process.

Figure 23:
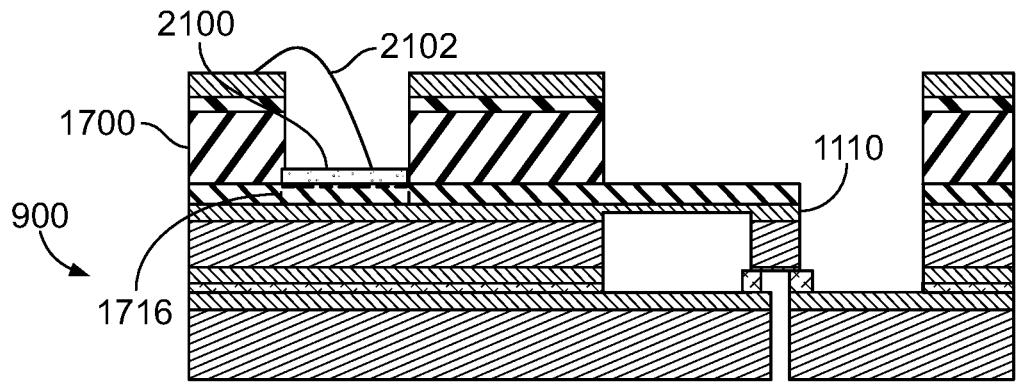

In an operation 1612, electrical connections are formed between the actuating beams and the flex circuit. As shown in FIG. 23, bonding pads 2100 are disposed on the electrical connection portions 1716 of the actuating beams 1110. As described herein, at the electrical connection portions 1716, electrodes contained in the actuating beams 1110 may be exposed. As such, bonding pads 2100 are conductively connected to the electrodes, thus providing a pathway for electrical charge to travel to the layer of piezoelectric material contained in actuating beam 1110. Bonding pads 2100 may be formed of gold or any suitable material. In some embodiments, bonding pads 2100 are disposed on electrical connection portions 1716 prior to attachment of the input fluid manifold 1700 to the substrate 900. Bonding pads 2100 may be deposited using atomic vapor deposition or any other suitable method.

Wire bonds 2102 are provided that attach individual ones of the actuating beams 1110 to the conductive pathways contained in the flex circuit 2000. Wire bonds 2102 may be formed of gold or any other suitable material. Preferably, wire bonds 2102 are formed using a ball bonding technique. Ball bonding avoids the directional preference present in wedge bonding, thus rendering the jetting assembly easier to construct. As a result of the wire bonds 2102, electrical signals originating from a controller (e.g., external to the jetting assembly and connected to flex circuit 2000) may reach individual ones of the actuating beams 1110. As described herein, the application of such control signals may cause the actuating beams 1110 to depart from their default position and open fluid outlets at the orifice plate, resulting in fluid being emitted in a desired pattern.

Figure 24:
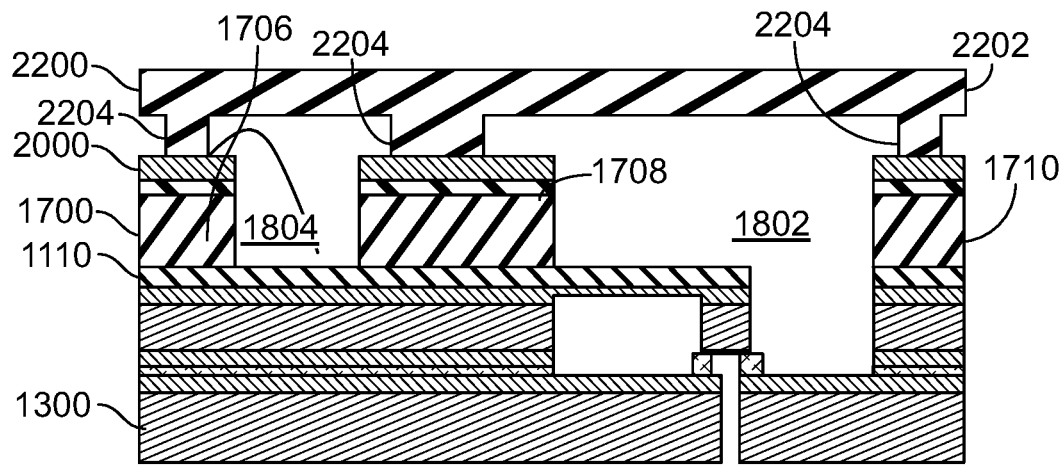

In an operation 1614 a structural layer is deposited on the flex circuit 2000. As shown in FIG. 24, a structural layer 2200 may include a planar portion 2202 with protrusions 2204 extending therefrom. To form structural layer 2200, a silicon substrate may be etched to form protrusions 2204 therein. Protrusions 2204 may be spaced so as to overlap with the first, second, and third arms 1706, 1708, and 1710 of input fluid manifold 1700. As shown, structural layer 2200 is attached to flex circuit 2000 at protrusions 2204 via any suitable adhesive material.

In one embodiment, structural layer 2200 is constructed of silicon. Generally, structural layer 2200 adds rigidity to the valve body to prevent bowing of orifice plate 1300 as a result of attachment of the valve body to a carrier. Beneficially, protrusions 2204 provide clearance between the openings 1802 and 1804 and the planar portion 2202. This provides space, for example, for fluid contained within the first opening 1802 and an encapsulant in the second opening 1804.

In some embodiments, instead of the structural layer 2200, an interposer (e.g., the interposer 222b shown in FIG. 5B) may be provided. The interposer may have a rigidity greater than a rigidity of the orifice plate 1300. A portion of the flex circuit 2000 (e.g., the flex circuit 216b shown in FIG. 5B) is position on the second surface 1704 of the input fluid manifold 1700 prior to attaching the carrier (e.g., the carrier 202b). For example, the portion of the flex circuit 2000 may be positioned on the first, second, and third arms 1706, 1708, and 1710 of input fluid manifold 1700. The interposer is positioned on the portion of the flex circuit. For example, the interposer be sized and shaped so as to be positioned on the second and third arms 1708 and 1710 and may be coupled to the flex circuit 2000 using an adhesive (e.g., SU-8 or any other suitable adhesive). The carrier is then positioned on the interposer.

Figure 25:
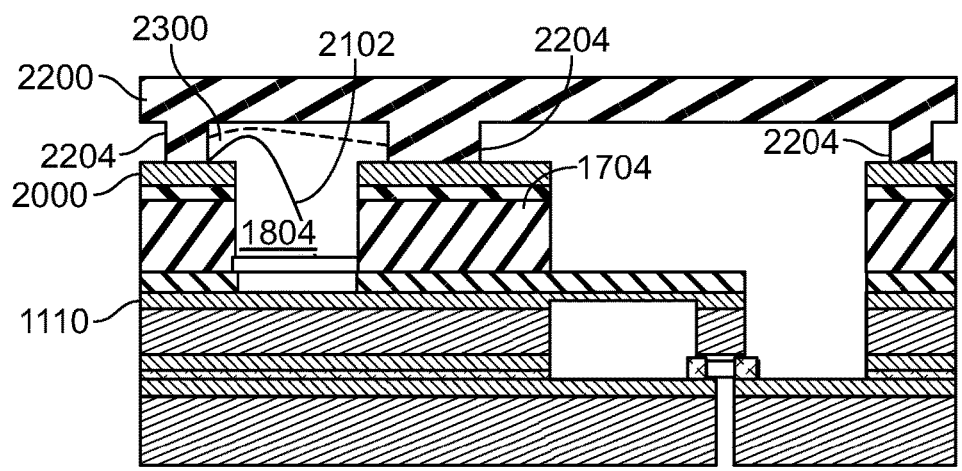

In an operation 1616, an encapsulant is deposited into an opening in the fluid manifold to cover the electrical connections contained therein. As shown in FIG. 25, an encapsulant 2300 is disposed in the second opening 1804 to cover the electrical connections between the wire bond 2102, flex circuit 2000, and actuating beam 1110. In some embodiment, structural layer 2200 includes an opening that overlaps the second opening 1804 to enable encapsulant to be disposed therein. As shown, the protrusions 2204 serve as a dam for encapsulant rising above the second surface 1704 of the input fluid manifold 1700. This facilitates complete coverage of electrical connections between the wire bond 2102 and flex circuit 2000. In other words, electrical connections within the jetting assembly are completely covered by encapsulant 2300 to ensure the maintenance of such connections and longevity of the jetting assembly's operation.

In an operation 1618, the valve body is attached to a carrier. In various embodiments, the carrier may be similar to the carrier 202/202b described with respect to FIG. 5A-5B, or any other carrier and define a cavity into which the valve body is disposed. The carrier may include a septum aligned with the reservoir 1750 such that pressurized fluid from an external fluid supply may enter the reservoir 1750. Carrier may be structured as disclosed with respect to FIG. 1 to facilitate connection with an industrial marking device. In various embodiments, a manifold may be bonded to the carrier on a side thereof opposite the cavity in which the valve body is disposed. The manifold may be configured to communicate pressurized fluid from the external fluid supply to the reservoir 1750, for example, via the septum.

Figure 27:
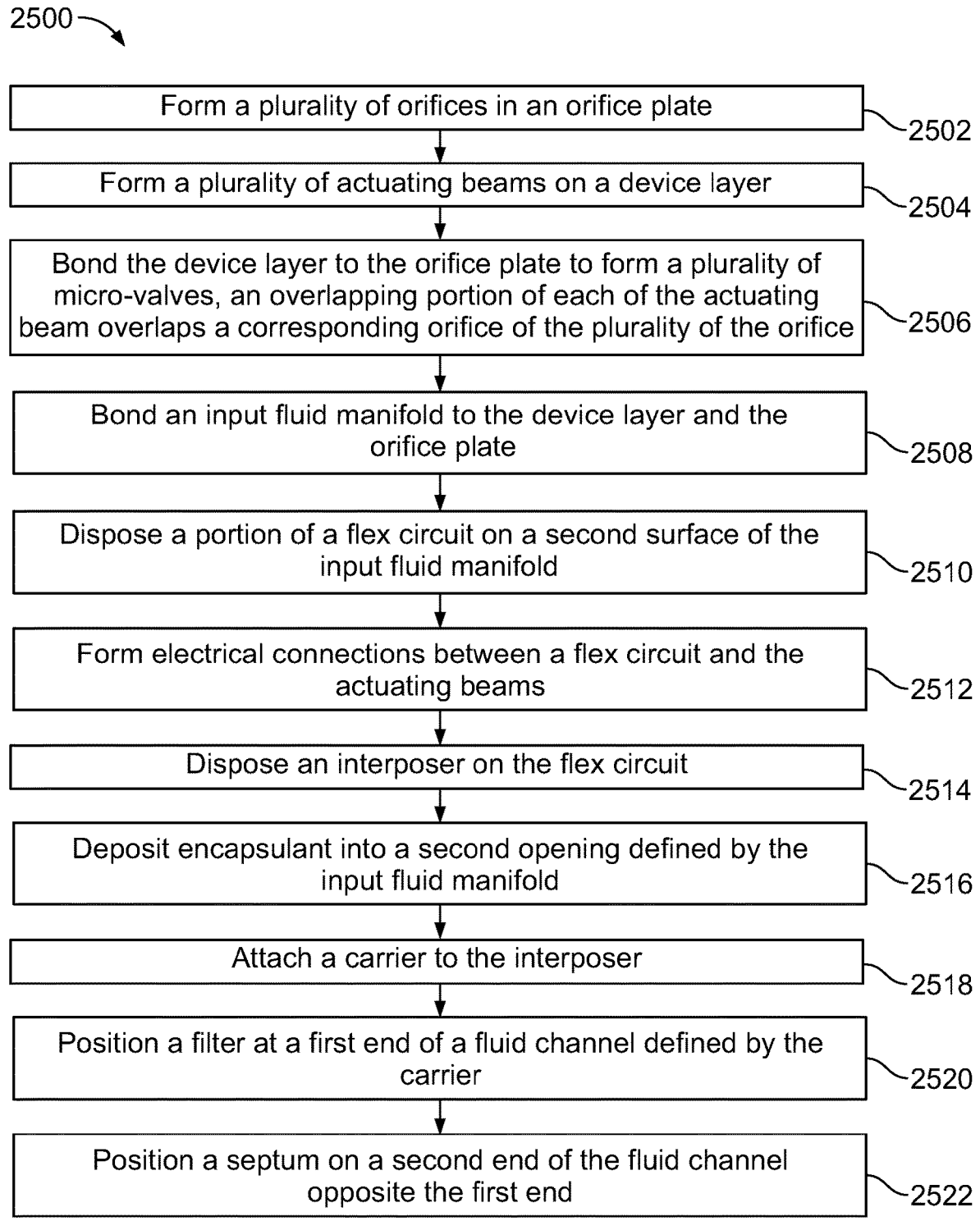
FIG. 27 is a schematic flow diagram of a method for forming a jetting assembly, according to an embodiment.

FIG. 27 is a schematic flow diagram of an example method 2500 for forming a jetting assembly (e.g., the jetting assembly 200b shown in FIG. 5B), according to an embodiment. The method 2500 includes forming a plurality of orifices in an orifice plate, at 2502. For example, the plurality of orifices 260b may be formed in the orifice plate 250b using any suitable method (e.g., wet etching, dry etching, sand blasting, drilling, etc.). In some embodiments, valve seat (e.g., the valve seat 270b) may be disposed around the orifice. The valve seat may be made from any suitable material, for example, silicon or SU-8. In particular embodiments, the valve seat may be photolithographically formed around the orifice.

At 2504, a plurality of actuating beams are formed on a device layer. For example, the plurality of the actuating beams 240b are formed on an SOI wafer, for example, as described with respect to FIGS. 9-11. Each of the actuating beams include a cantilevered portion (e.g., the cantilevered portion 308b) configured to cantilever about a base portion (e.g., the base portion 306b). In some embodiments, a sealing member (e.g., the sealing member 290b) is positioned at an overlapping portion (e.g., the overlapping portion 292b) of each of the plurality of actuating beams, the sealing member configured to close the corresponding orifice (e.g., the orifice 260b) in a default position of the actuating beam (e.g., the actuating beam 240b).

At 2506, the device layer is bonded to the orifice plate to form a plurality of micro-valves such that an overlapping portion of each of the plurality of actuating beams overlaps a corresponding orifice of the orifice plate. For example, the device layer including the actuating beam 240b is bonded to the orifice plate 250b (e.g., via an adhesive such as SU-8) such that the overlapping portion 292b overlaps the orifice 260b and the valve seat 270b disposed around the orifice 260b. At 2508, a first surface of an input fluid manifold (e.g., the input fluid manifold 210b) is bonded to the device layer (e.g., the layer forming the actuating beam 240b). The input fluid manifold defines a first opening extending from the first surface to the second surface opposite the first surface. The cantilevered portion of each of the plurality of actuating beams is aligned with the corresponding first opening such that the input fluid manifold and the plurality of microvalves form a valve body (e.g., the valve body 298b). The valve body includes a fluid reservoir (e.g., the reservoir 300b) defined in part by the first opening.

At 2510, a portion of a flex circuit is disposed on the second surface of the input manifold. For example, a portion of the flex circuit 216b is disposed on a second surface of the input fluid manifold 210b, for example, on a plurality of arms defined by the input fluid manifold 210b, as shown in FIG. 5B. The portion of the flex circuit 216 may be coupled to the second surface, for example via an adhesive. At 2512, electrical connections are formed between the flex circuit and the actuating beams. For example, the actuating beam 240b may be electrically coupled to the flex circuit 216b via the wire bond 220b. At 2514, an interposer is disposed on the portion of the flex circuit. The interposer having a rigidity greater than a rigidity of the orifice plate. For example, the interposer 222b may be disposed on the portion of the flex circuit 216b positioned on the input fluid manifold 210b, and coupled thereto via an adhesive. In some embodiments, the input manifold (e.g., the input manifold 210b) defines a second opening extending substantially parallel to the first opening. In such embodiments, bonding the input fluid manifold to the device layer aligns the second opening with an electrical connection portion (e.g., the electrical connection portion 294b) of the plurality of actuating beams (e.g., the actuating beams 240b). In such embodiments, an encapsulant may be deposited into the second opening so as to cover the electrical connection portion, at 2516. For example, the encapsulant 218b may be disposed in the second channel 214b aligned with the electrical connection portion 294b.

At 2518, a carrier is attached to the interposer. For example, the upper portion 204b of the carrier 202b is positioned on the interposer 222b and coupled thereto via an adhesive. In some embodiments, the carrier (e.g., the carrier 202b) defines a fluid channel (e.g., the fluid channel 211b) therethrough. In such embodiments, the method 2500 further includes positioning a filter at a first end of the fluid channel proximate to the valve body, at 2520. For example, the filter 213b may be positioned at the first end of the fluid channel 211b defined in the carrier 202b. The filter may be configured to filter particulate matter from the fluid flowing into the valve body and may include, for example, a 10-15 micron filter. In some embodiments, the method 2500 also includes positioning a septum at a second end of the fluid channel opposite the first end. For example, the septum 208 be may be positioned at the second end of the fluid channel 211b opposite the first end and secured between carrier 202b and the cover 203b or bonded to the carrier 202b via an adhesive. The septum may be configured to receive an insertion needle therethrough, the insertion needle configured to insert a fluid into the fluid channel.

Figure 28:
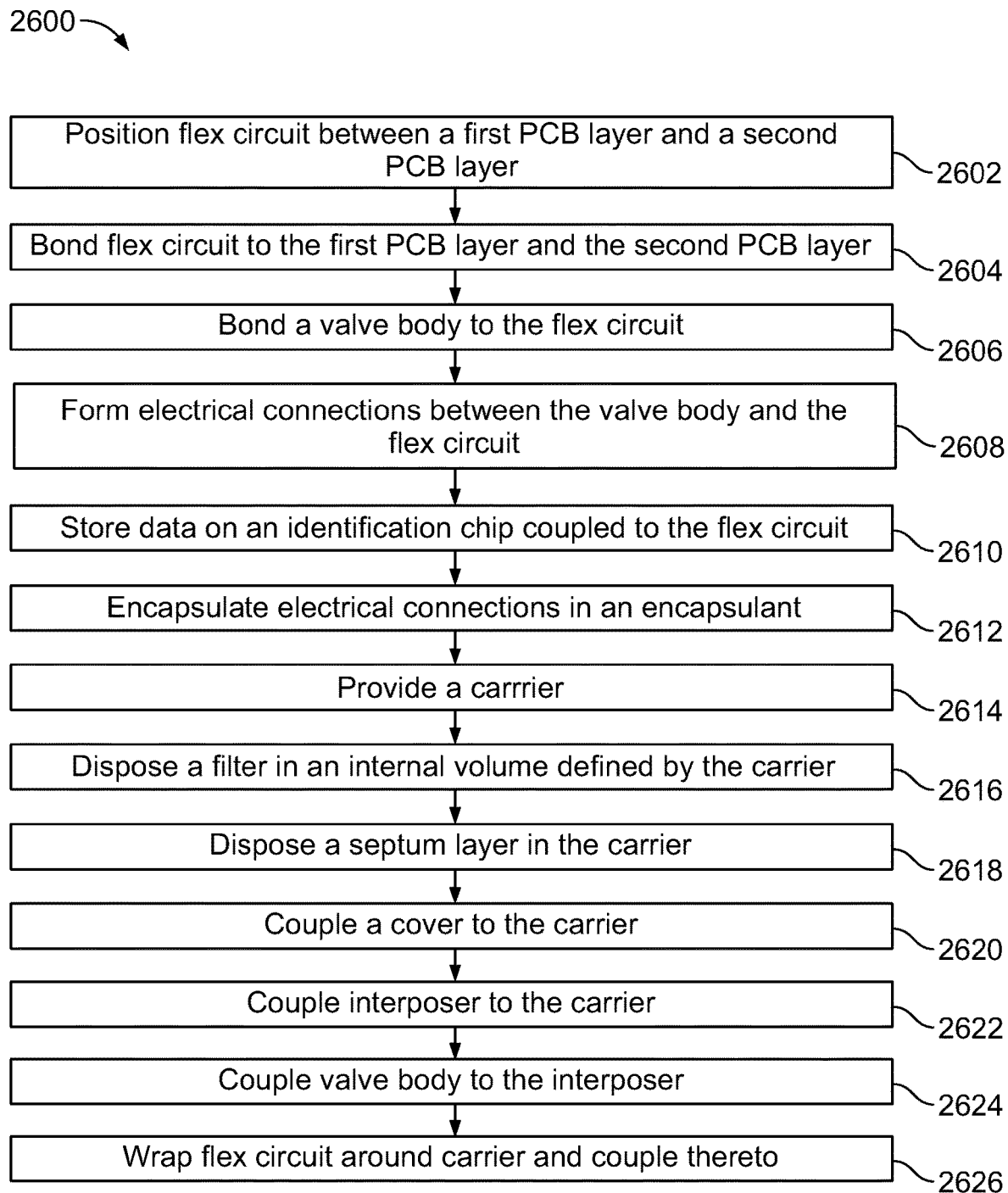
FIG. 28 is a schematic flow diagram of a method for forming a jetting assembly, according to another embodiment.

FIGS. 28A-B are schematic flow diagrams of a method 2600 for forming a jetting assembly (e.g., the jetting assembly 100, 200, 200b or any other jetting assembly), according to another embodiment. The method 2600 includes positioning a flex circuit between a first printed circuit board (PCB) layer and a second PCB, at 2602. For example, the flex circuit 114, 216, 216b is positioned between two layers of the circuit board 104, 215b. At 2604, the flex circuit is bonded to the first PCB layer and the second PCB layer. For example, the flex circuit may be disposed onto a fixture, and an adhesive dispensed onto the flex circuit. The flex circuit may then be clamped between the first and second PCB layer. An identification tag) or chip (e.g., the identification tag 106) may also be bonded to the flex circuit.

At 2606, a valve body is bonded to the flex circuit. For example, the flex circuit may be disposed in a fixture and an adhesive dispensed therein. A valve body (e.g., the valve body 102, 298, 298b) may be disposed on the adhesive, and the adhesive cured, for example, baked in an oven to bond the valve body to the flex circuit.

At 2608, electrical connections are formed between the valve body and the flex circuit. For example, electrical leads may be wire bonded to corresponding electrical connection pad included in the valve body and the flex circuit. In some embodiments, the method 2600 may include storing data on the identification tag or chip bonded to the flex circuit, at 2610. For example, identification information may be stored in the identification tag after the curing process so as to prevent the information from being erased when the temperature of the identification tag increased during the adhesive bonding process.

At 2612, the electrical connections are encapsulated in an encapsulant. For example, the encapsulant 218, 218b, for example, an electrically insulative adhesive is disposed on the electrical connections and cured so as to protect the electrical connections, as previously described herein.

At 2614, a carrier is provided. The carrier may include, for example, the carrier 108, 202, 202b or any other carrier described herein. The carrier may include a molded (e.g., a plastic injection blow-molded) part that may be smoothened or polished (e.g., bead blasted) to have a certain surface roughness. The carrier may then be cleaned, for example, in an ultrasonic bath.

At 2616, a filter may be disposed in an internal volume defined by the carrier. For example, the filter 213b may be provide an after being cleaned (e.g., washed in an ultrasonic bath) disposed in the carrier and bonded therein (e.g., heat staked therein). At 2618, a septum layer is disposed in the carrier. For example, the septum 208, 208b or a septum sheet may be disposed in the carrier, for example, proximate to an opening provided in the carrier. At 2620, a cover (e.g., the cover 203b) is coupled to the carrier (e.g., bonded via an adhesive or ultrasonically bonded thereto). In some embodiments, the cover may be coupled to the carrier such that the septum layer is clamped between the cover and the carrier, thereby securing the septum layer therebetween. The cover may define at least one opening to allow a fluid delivery needle and/or a fluid outlet needle to be inserted through the septum into the carrier to allow fluid to be delivered into the carrier and/or returned from the carrier.

At 2622, an interposer is coupled to the carrier. For example, adhesive is disposed on a location of the carrier where the valve body is intended to be located, and the interposer (e.g., the interposer 222b) bonded to the carrier. The adhesive is cured to bond the interposer to the carrier. At 2624, the valve body is coupled to the interposer, such that an input fluid manifold of the valve body is fluidly coupled to the carrier. At 2626, the flex circuit coupled to the valve body is wrapped around the carrier and bonded thereto, for example, via an adhesive. Mounting pegs (e.g., the mounting pegs 126) may be used to align and secure the flex circuit around the carrier.

In some embodiments, a method of constructing a micro-valve comprises providing a substrate for an actuating beam of the micro-valve, the substrate including a first surface and a second surface; forming a plurality of constituent layers on top of the first surface, wherein the plurality of constituent layers includes a layer of piezoelectric material; removing a portion of the substrate at least one of the first surface or the second surface to define a cantilevered portion of the actuating beam; providing an orifice plate including an orifice;

providing a valve seat on a surface of the orifice plate, wherein the valve seat comprises an opening aligned with the orifice; and attaching the surface of the orifice plate to the second surface via an adhesive such that an overlapping portion of the cantilevered portion overlaps the orifice.

In some embodiments, the substrate comprises a double silicon on insulator (SOI) wafer comprising a first silicon layer located between a first silicon dioxide layer silicon dioxide and a second silicon dioxide layer, the first silicon dioxide layer defining the first surface, a second silicon layer located between the second silicon dioxide layer and a third silicon dioxide layer, and a base layer located below the third silicon dioxide layer. In such embodiments, the method further comprises removing the base layer such that the third silicon dioxide layer defines the second surface.

In some embodiments, removing the portion of the substrate at the second surface comprises: depositing an etching mask on the second surface, the etching mask comprising an opening defining the portion of the substrate; and etching the substrate such that the portion of the substrate is removed.

In some embodiments, the opening in the etching mask includes a first portion and a second portion extending from the first portion, the first portion having a different shape from the second portion. In some embodiments, the first portion is substantially trapezoidal-shaped and the second portion is substantially circular-shaped.

In some embodiments, the removed portion of the substrate comprises the first silicon dioxide layer, the first silicon layer, the third silicon dioxide layer and the base layer such that the cantilevered portion comprises the second silicon dioxide layer and the second silicon layer, wherein the method further comprises releasing the actuating beam.

In some embodiments, the portion of the substrate is offset from an end of the substrate such that a sealing member is formed at an end of the cantilevered portion. In some embodiments, the sealing member has a larger cross-sectional area than the orifice. In some embodiments, the surface of the orifice plate is attached to the second surface such that the sealing member contacts the valve seat to close the opening. In some embodiments, the sealing member and the orifice are substantially cylindrical-shaped. In some embodiments, the cantilevered portion has a length between 500 microns and 1,000 microns.

In some embodiments, forming the plurality of constituent layers on the first surface comprises: depositing a barrier layer on the first surface; depositing a first adhesion layer on the barrier layer; depositing a first electrode on the first adhesion layer; and depositing the layer of piezoelectric material on the first electrode. In some embodiments, forming the plurality of constituent layers of the actuating beam comprises depositing a growth template layer on the first electrode prior to depositing the layer of piezoelectric material.

In some embodiments, forming the plurality of constituent layers of the actuating beam on the first surface comprises: depositing a second adhesion layer on the layer of piezoelectric material; and depositing a second electrode on the second adhesion layer. In some embodiments, the first and second adhesion layers are constructed of titanium dioxide and titanium, respectively, and wherein the first and second electrodes are constructed of platinum.

In some embodiments, a method of constructing a jetting assembly comprises: forming a plurality of micro-valves on an orifice plate, wherein each of the micro-valves includes an actuating beam having a cantilevered portion; providing an input fluid manifold including a first surface, a second surface, and a first opening extending from the first surface to the second surface; attaching the first surface of the input fluid manifold to a device layer that includes the actuating beams such that some of the cantilevered portions of the actuating beams are aligned with the corresponding first opening, wherein the input fluid manifold and the plurality of micro-valves form a valve body, the valve body including a fluid reservoir defined in part by the first opening; attaching a flex circuit to the second surface of the input fluid manifold, wherein the flex circuit includes a gap aligned with the first opening; and attaching a carrier to the valve body.

In some embodiments, each of the actuating beams comprises an electrical connection portion and a base portion extending from the electrical connection portion, wherein the cantilevered portion extends from the base portion, wherein the first opening comprises a rectangular channel, wherein the input fluid manifold comprises a second opening, the second opening extending substantially parallel to the first opening, wherein attaching the first surface of the input fluid manifold to the plurality of micro-valves is performed such that the second opening is aligned with at least some of the electrical connection portions.

In some embodiments, the method further comprises forming electrical connections between the electrical connection portions and the flex circuit via the second opening prior to attaching the carrier. In some embodiments, the method further comprises depositing an encapsulant into the second opening such that the encapsulant covers the electrical connections.

In some embodiments, attaching the first surface of the input fluid manifold to the device layer comprises: forming a compartmentalized adhesive structure on the first surface of the input fluid manifold; and attaching the device layer to the compartmentalized adhesive structure. In some embodiments, the compartmentalized adhesive structure includes a first plurality of segments of an adhesive that substantially surround the first opening and a second plurality of segments of an adhesive that substantially surround the second opening.

In some embodiments, a central portion of the first surface of the input fluid manifold between the first opening and the second opening, subsets of the first plurality of segments and second plurality of segments form two substantially linear adhesive structures disposed between the first opening and the second openings. In some embodiments, a peripheral portion of the first surface of the input fluid manifold, the first plurality of segments and the second plurality of segments form a plurality of concentric adhesive structures that substantially surround the first and second openings.

In some embodiments, the first and second pluralities of segments are formed using a single mask in a UV-exposure process of an adhesive material. In some embodiments, the adhesive material comprises a photoresist. In some embodiments, the photoresist comprises SU-8, wherein the carrier comprises a structural layer having a rigidity greater than a rigidity of the orifice plate, and wherein the method further comprises: depositing an adhesive on the second surface of the fluid input manifold; and disposing the carrier on the second surface of the fluid input manifold such that the structural layer is coupled to the fluid input manifold via the adhesive.

In some embodiments, the method further comprises: disposing a flex circuit in between the adhesive surface of the fluid input manifold and the carrier; and disposing an adhesive on the a surface of the flex circuit proximate to the carrier such that the flex circuit is coupled to each of the structural layer of the carrier and the fluid input manifold.

In some embodiments, providing the structural layer includes forming protrusions in a layer of a structural material, the protrusions arranged in a manner that corresponds to circumferential boundaries of the first and second openings, wherein depositing the structural layer on the second surface on the input fluid manifold includes attaching surfaces of the protrusions to the second surface of the input fluid manifold such that the protrusions substantially surround the first and second openings.

In some embodiments, the method further comprises: providing an interposer having a rigidity greater than a rigidity of the orifice plate; positioning a portion of the flex circuit on the second surface of the fluid input manifold; positioning the interposer on the portion of the flex circuit; and positioning the carrier on the interposer.

In some embodiments, forming the plurality of micro-valves on the orifice plate comprises, for each micro-valve: providing a substrate for the actuating beam of the micro-valve, the substrate including a first surface and a second surface; forming a plurality of constituent layers of the actuating beam on the first surface, wherein the plurality of constituent layers include a layer of piezoelectric material; removing a portion of the substrate at the second surface to define the cantilevered portion; providing a valve seat on a surface of the orifice plate at an orifice in the orifice plate, wherein the valve seat comprises an opening aligned with the orifice; and attaching the surface of the orifice plate to the second surface via an adhesive such that an overlapping portion of the cantilevered portion overlaps the orifice.

In some embodiments, forming the plurality of constituent layers on the first surface of the actuating beam on the first surface comprises: depositing a barrier layer on the first surface; depositing a first adhesion layer on the barrier layer; depositing a first electrode on the first adhesion layer; depositing a growth template layer on the first electrode prior to depositing the layer of piezoelectric material; depositing the layer of piezoelectric material on the first electrode; depositing a second adhesion layer on the layer of piezoelectric material; and depositing a second electrode on the second adhesion layer.

In some embodiments, a method for forming a jetting assembly, comprises: forming a plurality of orifices in an orifice plate; forming a plurality of actuating beams on a device layer, each of the plurality of actuating beams having a cantilevered portion; bonding the device layer to the orifice plate to form a plurality of micro-valves such that an overlapping portion of each of the plurality of actuating beams overlaps a corresponding orifice of the orifice plate; bonding a first surface of an input fluid manifold to the device layer and the orifice plate, the input fluid manifold defining a first opening extending from the first surface to the second surface opposite the first surface, the cantilevered portion of each of the plurality of actuating beams aligned with the corresponding first opening such that the input fluid manifold and the plurality of micro-valves form a valve body, the valve body including a fluid reservoir defined in part by the first opening; disposing a portion of a flex circuit on the second surface of the input fluid manifold; forming electrical connections between the flex circuit and the actuating beams; disposing an interposer on the portion of the flex circuit, the interposer having a rigidity greater than a rigidity of the orifice plate; and attaching a carrier to the interposer.

In some embodiments, a sealing member is positioned at the overlapping portion of the each of the plurality of actuating beams, the sealing member configured to close the corresponding orifice in a default position of the actuating beam. In some embodiments, the method, further comprises disposing a valve seat around each of the plurality of orifices. In some embodiments, the input manifold defines a second opening extending substantially parallel to the first opening, and wherein bonding the input fluid manifold to the device layer aligns the second opening with an electrical connection portion of the plurality of actuating beams, and wherein the method further comprises depositing encapsulant into the second opening so as to cover the electrical connection portion.

In some embodiments, the carrier defines a fluid channel therethrough, and the method further comprises positioning a filter at a first end of the fluid channel proximate to the valve body. In some embodiments, the method further comprises positioning a septum at a second end of the fluid channel opposite the first end, the septum configured to receive an insertion needle therethrough, the insertion needle configured to insert a fluid into the fluid channel.

As used herein, the terms "about" and "approximately" generally mean plus or minus 10% of the stated value. For example, about 0.5 would include 0.45 and 0.55, about 10 would include 9 to 11, about 1000 would include 900 to 1100.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

The construction and arrangement of the elements as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" or as an "example" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A method of constructing a jetting assembly, comprising:
    forming a plurality of micro-valves on an orifice plate, wherein each of the micro-valves includes an actuating beam having a cantilevered portion;
    providing an input fluid manifold including a first surface, a second surface, and a first opening extending from the first surface to the second surface;
    attaching the first surface of the input fluid manifold to a device layer that includes the actuating beams such that some of the cantilevered portions of the actuating beams are aligned with the corresponding first opening, wherein the input fluid manifold and the plurality of micro-valves form a valve body, the valve body including a fluid reservoir defined in part by the first opening;
    attaching a flex circuit to the second surface of the input fluid manifold, wherein the flex circuit includes a gap aligned with the first opening; and
    attaching a carrier to the valve body.

2. The method of claim 1, wherein each of the actuating beams comprises an electrical connection portion and a base portion extending from the electrical connection portion, wherein the cantilevered portion extends from the base portion, wherein the first opening comprises a rectangular channel, wherein the input fluid manifold comprises a second opening, the second opening extending substantially parallel to the first opening, wherein attaching the first surface of the input fluid manifold to the plurality of micro-valves is performed such that the second opening is aligned with at least some of the electrical connection portions.

3. The method of claim 2, further comprising forming electrical connections between the electrical connection portions and the flex circuit via the second opening prior to attaching the carrier.

4. The method of claim 3, further comprising depositing an encapsulant into the second opening such that the encapsulant covers the electrical connections.

5. The method of claim 2, wherein attaching the first surface of the input fluid manifold to the device layer comprises:
    forming a compartmentalized adhesive structure on the first surface of the input fluid manifold; and
    attaching the device layer to the compartmentalized adhesive structure.

6. The method of claim 5, wherein the carrier comprises a structural layer having a rigidity greater than a rigidity of the orifice plate, and wherein the method further comprises: disposing the carrier on the second surface of the fluid input manifold so as to couple the structural layer to the fluid input manifold.

7. The method of claim 6, further comprising:
    disposing a flex circuit in between the fluid input manifold and the carrier; and
    coupling the flex circuit to each of the structural layer of the carrier and the fluid input manifold.

8. The method of claim 1, further comprising:
    providing an interposer having a rigidity greater than a rigidity of the orifice plate;
    positioning a portion of the flex circuit on the second surface of the fluid input manifold;
    positioning the interposer on the portion of the flex circuit; and
    positioning the carrier on the interposer.

9. The method of claim 1, wherein forming the plurality of micro-valves on the orifice plate comprises, for each micro-valve:
    providing a substrate for the actuating beam of the micro-valve, the substrate including a first surface and a second surface;
    forming a plurality of constituent layers of the actuating beam on the first surface, wherein the plurality of constituent layers include a layer of piezoelectric material; and
    removing a portion of the substrate at the second surface to define the cantilevered portion.

10. The method of claim 9, wherein forming the plurality of micro-valves on the orifice plate further comprises, for each micro-valve:
    providing a valve seat on a surface of the orifice plate at an orifice in the orifice plate, wherein the valve seat comprises an opening aligned with the orifice; and
    attaching the surface of the orifice plate to the second surface such that an overlapping portion of the cantilevered portion overlaps the orifice.

11. The method of claim 9, wherein the substrate comprises a double silicon on insulator (SOI) wafer comprising:
    a first silicon layer located between a first silicon dioxide layer and a second silicon dioxide layer, the first silicon dioxide layer defining the first surface,
    a second silicon layer located between the second silicon dioxide layer and a third silicon dioxide layer, and
    a base layer located adjacent to the third silicon dioxide layer on a side opposite the second silicon layer,
    wherein the method further comprises removing the base layer such that the third silicon dioxide layer defines the second surface.

12. The method of claim 11, wherein the removing a portion of the substrate comprises, for each micro-valve:
    defining a perimetral shape of each of the actuating beam on the substrate from the first surface;
    defining a sealing member and a spacer on the substrate from the second surface; and
    releasing the actuating beam.

13. The method of claim 10, wherein, for each micro-valve, the portion of the substrate is offset from an end of the substrate such that a sealing member is formed at an end of the cantilevered portion.

14. The method of claim 13, wherein, for each micro-valve, the sealing member has a larger cross-sectional area than the orifice.

15. The method of claim 14, wherein, for each micro-valve, the surface of the orifice plate is attached to the second surface such that the sealing member contacts the valve seat to close the opening.

16. The method of claim 9, wherein forming the plurality of constituent layers on the first surface comprises, for each micro-valve:
   depositing a barrier layer on the first surface;
   depositing a first electrode on the barrier layer;
   depositing the layer of piezoelectric material on the first electrode; and
   depositing a second electrode on the layer of piezoelectric material.

17. The method of claim 16, wherein forming the plurality of constituent layers of the actuating beam comprises, for each micro-valve, depositing a growth template layer on the first electrode prior to depositing the layer of piezoelectric material.

* * * * *

UNITED STATES PATENT AND TRADEMARK OFFICE
CERTIFICATE OF CORRECTION

| | | |
|---|---|---|
| PATENT NO. | : 11,639,057 B2 | Page 1 of 1 |
| APPLICATION NO. | : 16/407476 | |
| DATED | : May 2, 2023 | |
| INVENTOR(S) | : Buskirk et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1028 days.

Signed and Sealed this
Seventh Day of January, 2025

Derrick Brent
*Acting Director of the United States Patent and Trademark Office*